United States Patent
Welch et al.

(10) Patent No.: US 6,998,072 B2
(45) Date of Patent: Feb. 14, 2006

(54) PHOTOCHROMIC POLYMERIZABLE COMPOSITIONS

(75) Inventors: Cletus N. Welch, Massillon, OH (US); Eric M. King, Pittsburgh, PA (US); Lawrence G. Anderson, Pittsburgh, PA (US); Randy E. Daughenbaugh, Turtle Creek, PA (US); Kevin J. Stewart, Murrysville, PA (US)

(73) Assignee: Transitions Optical, Inc., Pinellas Park, FL (US)

( * ) Notice: Subject to any disclaimer, the term of this patent is extended or adjusted under 35 U.S.C. 154(b) by 299 days.

(21) Appl. No.: 10/270,622

(22) Filed: Oct. 16, 2002

(65) Prior Publication Data

US 2003/0136948 A1    Jul. 24, 2003

Related U.S. Application Data

(60) Provisional application No. 60/335,871, filed on Nov. 1, 2001.

(51) Int. Cl.
*G02B 5/23* (2006.01)
*G03C 1/00* (2006.01)

(52) U.S. Cl. .................. 252/586; 359/241; 430/495.1; 430/962

(58) Field of Classification Search ................ 252/586
See application file for complete search history.

(56) References Cited

U.S. PATENT DOCUMENTS

| | | | |
|---|---|---|---|
| 3,928,299 A | 12/1975 | Rosenkranz et al. | 260/89.5 |
| 3,947,338 A | 3/1976 | Jerabek et al. | 204/181 |
| 3,984,299 A | 10/1976 | Jerabek | 204/181 |
| 4,131,731 A | 12/1978 | Lsi et al. | 528/370 |
| 4,160,853 A | 7/1979 | Ammons | 428/425 |
| 4,250,322 A | 2/1981 | Effimov et al. | 560/26 |
| 4,360,653 A | 11/1982 | Stevens | 526/301 |
| 4,377,530 A | 3/1983 | Trenbeath et al. | 260/453 |
| 4,379,767 A | 4/1983 | Alexanian et al. | 260/453 |
| 4,439,616 A | 3/1984 | Singh et al. | 560/25 |
| 4,442,145 A | 4/1984 | Probst et al. | 427/385 |
| 4,720,356 A | 1/1988 | Chu | 252/586 |
| 4,891,421 A | 1/1990 | Nishimura et al. | 528/370 |
| 4,994,208 A * | 2/1991 | McBain et al. | 252/586 |
| 5,143,997 A | 9/1992 | Endo et al. | 528/60 |
| 5,200,483 A | 4/1993 | Selvig | 526/301 |
| 5,236,978 A | 8/1993 | Selvig et al. | 524/81 |
| 5,266,551 A | 11/1993 | Bailey et al. | 503/227 |
| 5,342,554 A | 8/1994 | McBain et al. | 523/466 |
| 5,373,033 A | 12/1994 | Toh et al. | 522/96 |
| 5,391,327 A | 2/1995 | Ligas et al. | 252/586 |
| 5,527,879 A | 6/1996 | Nakae et al. | 528/371 |
| 5,621,017 A * | 4/1997 | Kobayakawa et al. | 522/16 |
| 5,645,767 A | 7/1997 | Van Gemert | 252/586 |
| 5,770,115 A | 6/1998 | Misura | 252/586 |
| 5,965,680 A | 10/1999 | Herold et al. | 526/313 |
| 5,973,093 A * | 10/1999 | Daughenbaugh et al. | 526/314 |
| 6,025,026 A * | 2/2000 | Smith et al. | 427/316 |
| 6,083,427 A | 7/2000 | Henry | 252/586 |
| 6,107,395 A * | 8/2000 | Rosthauser et al. | 524/719 |
| 6,150,430 A | 11/2000 | Walters et al. | 522/79 |
| 6,153,126 A | 11/2000 | Kumar | 252/586 |
| 6,187,444 B1 * | 2/2001 | Bowles et al. | 428/423.1 |
| 6,296,785 B1 | 10/2001 | Nelson et al. | 252/586 |

FOREIGN PATENT DOCUMENTS

JP         08041147 A    *    2/1996

OTHER PUBLICATIONS

Crano, John C., "Chromogenic Materials (Photochromic)", *Kirk-Othmer Encyclopedia of Chemical Technology*, Fourth Ed., 1993, pp. 321-332.

Eisenbach, Claus D., "New Aspects of Photochromism in Bulk Polymers", Photographic Science and Engineering, 1979, pp. 183-190.

*Ullmann's Encyclopedia of Industrial Chemistry*, Fifth Ed., 1989, vol. A14, pp. 611-625.

U.S. Appl. No. 10/270,657, "Articles Having a Photochromic Polymeric Coating", Cletus N. Welch, et.al., Oct. 16, 2002.

Thomas, Mary R., "Isocyanatoethyl Methacrylate: A Heterofunctional Monomer For Polyurethane and Vinyl Polymer Systems", Organic Coatings and Polymer Science Proceedings, vol. 46, 1982, pp. 506-513.

Hoover, F.W. et.al., "Chemistry of Isocyanic Acid. II. Reaction With A,B-Unsaturated Ethers", Journal of Organic Chemistry, vol. 28, 1963, pp. 2082-2085.

Hawley's Condensed Chemical Dictionary, Thirteenth Ed., 1997, John Wiley & Sons, pp. 901-902.

* cited by examiner

*Primary Examiner*—Robert E.L. Sellers
*Assistant Examiner*—Timothy J. Kugel
(74) *Attorney, Agent, or Firm*—Frank P. Mallak

(57) ABSTRACT

Described is a polymerizable composition of a photochromic amount of at least one photochromic compound, at least one material having at least one carbonate group and at least one hydroxyl group, and at least one monoisocyanate containing material having at least one unsaturated group. The polymerizable composition optionally contains copolymerizable monomers. Also described are photochromic polymerizates, e.g., photochromic optical elements such as ophthalmic lenses, prepared from the polymerizable composition of the present invention.

32 Claims, No Drawings

PHOTOCHROMIC POLYMERIZABLE COMPOSITIONS

CROSS REFERENCE TO RELATED APPLICATIONS

This application claims priority to provisional application Ser. No. 60/335,871 filed Nov. 1, 2001.

BACKGROUND OF THE INVENTION

The present invention relates to a photochromic composition of at least one polymerizable material and a photochromic amount of at least one photochromic compound. The polymerizable composition optionally contains other copolymerizable monomers. Photochromic compounds can be added to the composition prior to polymerization or after a polymerizate is formed. The present invention also relates to photochromic polymerizates and photochromic articles.

Photochromism is a phenomenon involving a reversible change in color of a photochromic compound, or an article containing such a compound, upon exposure to light radiation containing ultraviolet rays, and a reversion to the original color when the influence of the ultraviolet radiation is discontinued. Sources of light radiation that contain ultraviolet rays include, for example, sunlight and the light of a mercury lamp. Discontinuation of the ultraviolet radiation can be achieved for example by storing the photochromic compound or article in the dark or by removing the source of ultraviolet radiation, e.g., by means of filtering.

The general mechanism responsible for the reversible change in color, i.e., a change in the absorption spectrum in the visible range of light (400–700 nm), exhibited by different types of photochromic compounds has been described and categorized. See John C. Crano, "Chromogenic Materials (Photochromic)", *Kirk-Othmer Encyclopedia of Chemical Technology*, Fourth Edition, 1993, pp. 321–332. The general mechanism for the most common classes of photochromic compounds, e.g., indolino spiropyrans and indolino spirooxazines, involves an electrocyclic mechanism. When exposed to activating radiation, these compounds transform from a colorless closed ring compound into a colored open ring species. In contrast, the colored form of fulgide photochromic compounds is produced by an electrocyclic mechanism involving the transformation of a colorless open ring form into a colored closed ring form.

In the aforedescribed electrocyclic mechanisms, the photochromic compounds require an environment in which they can reversibly transform. In solid polymer matrices, the rates at which the photochromic processes of activation, i.e., formation of color or darkening, and fading, i.e., the return to the original or colorless state, occur are believed to be dependent on the free volume in the polymer matrix. The free volume of the polymer matrix is dependent upon the flexibility of the chain segments of the polymer environment surrounding the photochromic compound, i.e., the local mobility or local viscosity of the chain segments comprising the matrix. See Claus D. Eisenbach, "New Aspects of Photochromism in Bulk Polymers", Photographic Science and Engineering, 1979, pp. 183–190. One of the main obstacles reported by Claus D. Eisenbach, for the larger commercial application of photochromic systems, is the slow rate of photochromic activation and fade in a solid polymer matrix.

Recently, photochromic plastic materials have been the subject of considerable attention in part due to the weight advantage that they can offer relative to ophthalmic lenses made of glass. In addition, photochromic transparencies for vehicles, such as automobiles and airplanes, have been of interest because of the potential safety features that such transparencies offer.

In addition to the slow rate of activation and fade of photochromic compounds in polymer matrices, a further drawback to the widespread commercial use of organic photochromic compounds in combination with plastic materials is the loss of their ability to exhibit a reversible change in color as a result of prolonged repeated exposure to ultraviolet (UV) light. This phenomenon is believed to be a result of irreversible decomposition of the organic photochromic compound and is referred to as fatigue.

While some advancements have been made toward increasing the fatigue resistance and improving the performance of photochromic materials, further improvements, even small incremental improvements, in the fatigue resistance and/or improving the performance of photochromic polymeric materials are still required. Hence, efforts to obtain such improvements have continued.

Although the use of photochromic compounds in combination with polymerizable compositions, e.g., (meth)acrylates, is known, the use of the polymerizable composition of the present invention with photochromic compounds has not been disclosed.

DETAILED DESCRIPTION OF THE INVENTION

In one non-limiting embodiment of the present invention, there is provided a polymerizable composition comprising a photochromic amount of at least one photochromic compound, at least one material having at least one carbonate group and at least one hydroxyl group and at least one monoisocyanate containing material having at least one unsaturated group. This composition can optionally contain other copolymerizable monomers.

In a further non-limiting embodiment, the polymerizable composition of the present invention is adapted to provide, when at least partially cured, a reduction in the percent photopic fatigue of the photochromic compound in the Accelerated Weathering Photochromic Percent Photopic Fatigue Test (AWPPPF Test). The AWPPPF Test is described in Example 15 herein. In the test, the polymerizable composition of the present invention and other polymerizable compositions are tested for photochromic performance and fatigue as components of a methacrylic coating composition.

In another non-limiting embodiment of the present invention, there is provided a polymerizable composition comprising component (a) a reaction product of a polyol comprising at least one carbonate group and an isocyanate comprising one reactive isocyanate group and at least one polymerizable double bond; and optionally component (b) at least one other monomer copolymerizable with component (a) and component (c) a photochromic amount of at least one photochromic compound.

In one non-limiting embodiment, it has unexpectedly been found that when the polymerizable composition of the present invention is used in a polymerizable photochromic composition, e.g., a methacrylic coating composition, there is a reduction in the Percent Fatigue of the photochromic compound, as described in the AWPPPF Test described in Example 15 herein. It has also been found that the polymerizable composition of the present invention demonstrated, in the aforementioned AWPPPF test, a lower amount of Percent Fatigue of the photochromic compound as compared to a polycarbonate based dimethacrylate monomer without a urethane group.

In the various non-limiting embodiments of the present invention, the exact nature of optional component (b) is not critical other than that it is copolymerizable with the polymerizable composition of the present invention. Any copolymerizable monomer can be used since the present invention relates to the photochromic polymerizable composition described and claimed herein.

In one non-limiting embodiment, the copolymerizable monomers of component (b) can be chosen from:

(a) a radically polymerizable monomer represented by the following formula:

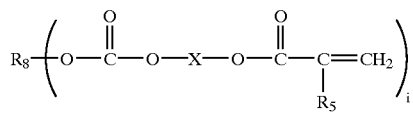

wherein $R_8$ is a polyvalent residue of a polyol, $R_5$ is hydrogen or methyl, i is chosen from an integer from 2 to 6, and X is a divalent linking group chosen from linear or branched chain alkylene, linear or branched chain polyoxyalkylene, cyclic alkylene, phenylene, residue of a polyol or a $C_1$–$C_4$ alkyl substituted phenylene;

(b) a radically polymerizable monomer represented by the following formula:

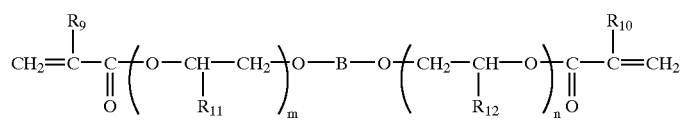

wherein m and n are each independently chosen from an integer from 0 to 6, the sum of m and n being from 0 to 6, $R_9$ and $R_{10}$ are each independently chosen from hydrogen or methyl, $R_{11}$ and $R_{12}$ are each independently chosen for each occurrence from hydrogen or $C_1$ to $C_4$ alkyl, and B is a divalent linking group chosen from linear or branched chain alkylene, phenylene, $C_1$–$C_9$ alkyl substituted phenylene, or a group represented by the following formula:

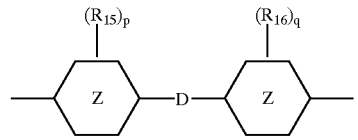

wherein $R_{15}$ and $R_{16}$ are each independently chosen for each occurrence from $C_1$–$C_4$ alkyl, chlorine or bromine, p and q are each independently chosen from an integer from 0 to 4,

represents a divalent benzene group or a divalent cyclohexane group and D is —O—, —S—, —S($O_2$)—, —C(O)—, —$CH_2$—, —CH=CH—, —C($CH_3$)$_2$—, —C($CH_3$)($C_6H_5$)—, or

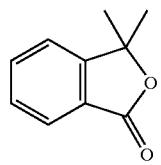

when

is the divalent benzene group, and D is —O—, —S—, —$CH_2$—, or —C($CH_3$)$_2$— when

is the divalent cyclohexane group;

(c) a radically polymerizable monomer represented by the following formula:

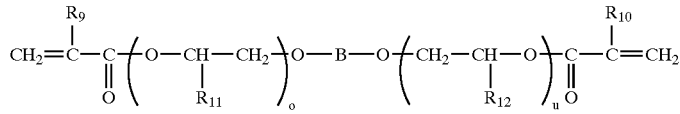

wherein o and u are each independently chosen from a positive number, the sum of o and u being from 7 to 70, $R_9$, $R_{10}$, $R_{11}$, $R_{12}$, and B are the same as defined hereinbefore;

(d) a radically polymerizable monomer represented by the following formula:

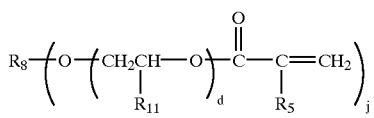

wherein $R_5$, $R_8$ and $R_{11}$ are the same as defined hereinbefore, d is chosen from a number from 0 to 20, and j is chosen from a number from 3 to 6;

(e) a reaction product of a polycarbonate polyol polychloroformate and a hydroxy(meth)acrylate;

(f) a reaction product of a polycarbonate polyol and (meth)acryloyl chloride;

(g) a radically polymerizable monomer that is monoethylenically unsaturated;

(h) a radically polymerizable monomer that is an allyl functional monomer having at least two allyl groups provided that said allyl functional monomer is used at a level that does not exceed 5 weight percent, based on the total weight of the monomers; or (i) a mixture thereof.

In various non-limiting embodiments, the polymerizable composition of the present invention can be used to produce photochromic polymerizates in which the photochromic compounds are added prior to polymerization, to an at least partially cured polymerizate or by a combination of such methods.

It is noted that, as used in this specification and the appended claims, the singular forms "a," "an," and "the" include plural referents unless expressly and unequivocally limited to one referent.

For the purposes of this specification, unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The phrase "an at least partially cured polymerizate" refers to a polymerizable composition in which the curable or cross-linkable components are at least partially cured, cross linked and/or reacted. In certain non-limiting embodiments of the present invention, the degree of reacted components can vary widely, e.g., from 5% to 100% of all of the possible curable, crosslinkable and/or reactable components.

The disclosure of the related applications, patents and articles listed by column and line number or specific citation herein which describe methods for preparing monomers, polymerizates and photochromic compounds are incorporated herein, in toto, by reference.

The term "polyol" is defined herein as a polyhydric alcohol having 2 or more hydroxyl groups, but is substantially free of carbonate groups unless indicated otherwise. A residue of a polyol or a radical derived from a polyol is what remains after removal of the hydroxyl group(s) from the polyol. The term "alkylene", when preceded by linear, i.e., straight, or branched chain, is defined herein as a hydrocarbon group having from 2 to 20 carbon atoms. The term "oxyalkylene" is defined herein as a hydrocarbon group having from 2 to 4 carbon atoms and 1 oxygen atom. Regarding "oxyalkylene groups", it is defined herein that the number of oxyalkylene included in formulas and described, for example as being an integer or number between 0 and 6, that partial numbers such as 1.1 or 5.9 are included within the range specified. The term "cyclic alkylene" is defined herein as a cyclic hydrocarbon group having from 3 to 7 carbon atoms. The term "(meth)acryloyl" is defined as acryloyl groups, methacryloyl groups, or combinations of acryloyl and methacryloyl groups. The term "(meth)acrylate" is defined here as acrylates, methacrylates or combinations of acrylates and methacrylates. The term "(meth)acrylic" is defined here as acrylic, methacrylic or combinations of acrylic and methacrylic groups.

In the descriptions of components (a) and (b), like letters and like terms have the same meaning unless stated otherwise.

The polymerizable composition of the present invention, in one non-limiting embodiment, is the reaction product of: at least one material comprising at least one carbonate group and at least one hydroxyl group, such as a carbonate group containing alcohol or polyol or a (meth)acrylic monomeric material containing at least one carbonate and at least one hydroxyl group; at least one monoisocyanate containing material having at least one unsaturated group, such as the reaction product of an (meth)acrylic monomeric material containing a vinyl ether group and isocyanic acid; and a photochromic amount of at least one photochromic compound.

In another non-limiting embodiment, component (a) being the reaction product of an isocyanate comprising one reactive isocyanate group and at least one polymerizable double bond and a polyol comprising at least one carbonate group can be represented by the following formula:

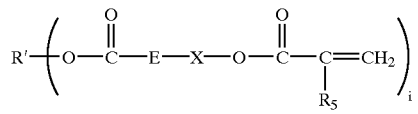

wherein R' is a residue of a polyol comprising at least one carbonate group, $R_5$ is hydrogen or methyl, E is —NH—; X is a divalent linking chosen from linear or branched chain alkylene, linear or branched chain polyoxyalkylene, cyclic alkylene, phenylene, residue of a polyol or $C_1$–$C_4$ alkyl substituted phenylene, and i is an integer from 2 to 6. In another non-limiting embodiment, R' is a residue of a polyol comprising at least two carbonate groups.

In one non-limiting embodiment, the polycarbonate polyol of component (a) can be represented by the following formula:

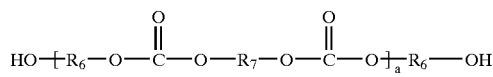

wherein $R_6$ and $R_7$ can be the same or different and are each independently chosen for each occurrence from divalent linear or branched alkylene groups, cyclic alkylene groups or divalent $C_6$–$C_{15}$ aromatic radicals, e.g. 2,2-diphenylenepropane, and a is an integer from 1 to 20.

In another non-limiting embodiment, the polycarbonate polyols of the aforementioned formula can be formed by the reaction of at least one bis(chloroformate) with at least one polyol, e.g., a diol, as described in U.S. Pat. No. 5,266,551. One of the components can be used in excess to limit and control the molecular weight of the resulting polycarbonate polyol. As shown in the following non-limiting illustration of a Polycarbonate Preparation Scheme, the diol is in excess and becomes the end group.

Polycarbonate Preparation Scheme

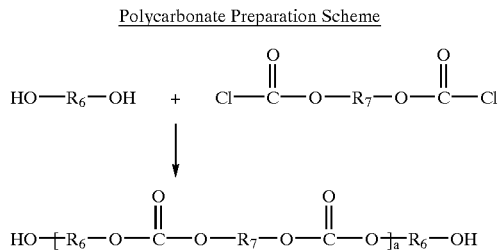

Examples of bis(chloroformates) which can be used in the aforedescribed preparation scheme include, but are not limited to: monoethylene glycol bis(chloroformate), diethylene glycol bis(chloroformate), propanediol bis(chloroformate), butanediol bis(chloroformate), hexanediol bis(chloroformate), neopentyldiol bis(chloroformate), bisphenol A bis(chloroformate) or a mixture thereof.

Examples of polyols which can be used in the aforedescribed preparation scheme include, but are not limited to: bisphenol A; trimethylolethane; trimethylolpropane; di(trimethylolpropane)dimethylol propionic acid; ethylene glycol; propylene glycol; 1,3-propanediol; 2,2-dimethyl-1,3-propanediol; 1,2-butanediol; 1,4-butanediol; 1,3-butanediol; 1,5-pentanediol; 2,4-pentanediol; 2,2,4-trimethyl-1,3-pentanediol; 2-methyl-1,3-pentanediol; 2-methyl-1,5-pentanediol; 3-methyl-1,5-pentanediol; 1,6-hexanediol; 2,5-hexanediol; 2-ethyl-1,3-hexanediol; 1,4-cyclohexanediol; 1,7-heptanediol; 2,4-heptanediol; 1,8-octanediol; 1,9-nonanediol; 1,10-decanediol;; 2,2-dimethyl-3-hydroxypropyl-2,2-dimethyl-3-hydroxypropionate; diethylene glycol; triethylene glycol; tetraethylene glycol; polyethylene glycol; dipropylene glycol; tripropylene glycol; polypropylene glycol; 1,4-cyclohexanedimethanol; 1,2-bis(hydroxymethyl)cyclohexane; 1,2-bis(hydroxyethyl)cyclohexane; the alkoxylation product of 1 mole of 2,2-bis(4-hydroxyphenyl)propane (i.e., bisphenol-A) and from 2 to 10 moles of ethylene oxide, propylene oxide or a mixture thereof; poly(oxytetramethylene)diols or a mixture thereof.

In some non-limiting embodiments, the above materials can be combined to form a variety of compositions, chain lengths and end groups for a polycarbonate polyol. For example, the polyols can have terminal aliphatic hydroxyl groups (e.g., diethylene glycol groups), phenolic terminal groups (e.g., bisphenol A groups) or a mixture of such terminal hydroxyl groups.

In various non-limiting embodiments, the polycarbonate polyols as well as the materials containing at least one carbonate group and at least one hydroxyl group can be prepared by an ester interchange reaction of a dialkyl, diaryl or alkylene carbonate with a polyol, as described in U.S. Pat. Nos. 4,131,731, 4,160,853, 4,891,421 and 5,143,997. Other examples of such carbonate and hydroxyl group containing materials include products prepared: by the reaction of a polyol and phosgene, as described in U.S. Pat. No. 4,533,729; and by the reaction of a polycarbonate polyol with an acid anhydride or a dicarboxylic acid, as described in U.S. Pat. No. 5,527,879. Examples of commercially available products include but are not limited to: RAVECARB® 102–108 series of polycarbonate diols available from EniChem Synthesis Milano and PC 1122 available from Stahl USA.

In one non-limiting embodiment, the monoisocyanate used to produce the polymerizable composition of the present invention has a primary, secondary or tertiary isocyanate group, which is also referred to as a reactive isocyanate group, and at least one unsaturated group chosen from allylic, (meth)acrylic, vinyl or a mixture thereof. In another non-limiting embodiment, the unsaturated group is a group having a polymerizable double bond chosen from the (meth)acrylic group.

In a series of non-limiting embodiments, the isocyanate of component (a) as well as the monoisocyanate material containing at least one unsaturated group can be:

(1) an isocyanate represented by the following formula:

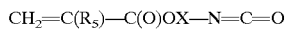

wherein $R_5$ and X are the same as previously described;

(2) m-isopropenyl-α,α-dimethyl benzyl isocyanate;

(3) a product of the reaction of at least one acrylic functional monomer containing a vinyl ether group and isocyanic acid; or (4) a mixture thereof.

In one non-limiting embodiment, isocyanates that can be used as reactants to form component (a) are materials that have one reactive isocyanate group and at least one polymerizable double bond. A non-limiting example of such a compound is isocyanatoethylmethacrylate. By way of non-limiting illustration, methods for preparation of such a compound have been disclosed by Thomas, Mary R., in "Isocyanatoethyl Methacrylate: A Heterofunctional Monomer for Polyurethane and Vinyl Polymer Systems", Organic Coatings and Polymer Science Proceedings, Volume 46, pp. 506–513, 1982. Non-limiting methods for preparation of m-isopropenyl-α,α-dimethyl benzyl isocyanate are disclosed in U.S. Pat. Nos. 4,377,530; 4,379,767; and 4,439,616. By way of further non-limiting illustration, methods for preparation of a product of the reaction of an acrylic functional monomer containing a vinyl ether group and isocyanic acid, e.g., 1-(2-methacryloxyethoxy)ethyl isocyanate, have been disclosed by Hoover, F. W., et al., in "Chemistry of Isocyanic Acid. II. Reaction with α, β-Unsaturated Ethers", Journal of Organic Chemistry, Volume 28, pp. 2082–2085, 1963.

In further non-limiting embodiments, the isocyanates of component (a), as defined herein, can include "modified" or "unmodified" isocyanates having "free", "blocked" or partially blocked isocyanate groups. The isocyanate-containing compounds can be chosen from aliphatic, aromatic, cycloaliphatic, heterocyclic isocyanates or a mixture thereof. The term "modified" is defined herein to mean that the aforementioned isocyanate-containing compounds are changed in a known manner to introduce biuret, urea, carbodiimide, urethane or isocyanurate groups. Other methods for modifying the isocyanates are described in *Ullmann's Encyclopedia of Industrial Chemistry*, Fifth Edition, 1989, Vol. A14, pages 611 to 625, and in U.S. Pat. No. 4,442,145 column 2 line 63 to column 3 line 31.

Free isocyanate groups are not stable, i.e., the isocyanate groups will react with water or compounds that contain reactive hydrogen atoms. In order to provide stable and storable isocyanates and/or isocyanate-containing compounds, the NCO groups may be blocked with certain selected organic compounds that render the isocyanate group inert to reactive hydrogen compounds at room temperature. When heated to elevated temperatures, e.g., between 90 and 200° C., the blocked isocyanates release the blocking agent and react in the same way as the original unblocked or free isocyanate.

In one non-limiting embodiment, the isocyanates can be fully blocked, as described in U.S. Pat. No. 3,984,299, column 1, lines 1 to 68, column 2 and column 3, lines 1 to 15, or partially blocked and reacted with the polymer backbone, as described in U.S. Pat. No. 3,947,338, column 2, line 65 to column 4, line 30. As used herein, the NCO in the NCO:OH ratio represents the free or reactive isocyanate of the free isocyanate-containing compounds and blocked or partially blocked isocyanate-containing compounds after the release of the blocking agent. In some cases, it is not possible to remove all of the blocking agent. In those situations, more of the blocked isocyanate-containing compound would be used to attain the desired level of free NCO.

In another non-limiting embodiment, the isocyanate-containing compound is chosen from the modified or unmodified group of compounds of aliphatic isocyanates, cycloaliphatic isocyanates, aromatic isocyanates, partially blocked aliphatic isocyanates, partially blocked cycloaliphatic isocyanates, partially blocked aromatic isocyanates or a mixture thereof. In another non-limiting embodiment, the isocyanate is chosen from the modified group of aliphatic isocyanates, cycloaliphatic isocyanates, aromatic isocyanates or a mixtures thereof. In a further non-limiting embodiment, the isocyanate component is an unmodified aliphatic isocyanate.

Generally, compounds used to block the isocyanates are certain organic compounds that have active hydrogen atoms. In one non-limiting embodiment, examples include volatile alcohols, amines, acidic esters, epsilon-caprolactam, triazoles, pyrazoles and ketoxime compounds. In another non-limiting embodiment, the blocking compounds can be selected from the group consisting of methanol, t-butanol, phenol, cresol, nonylphenol, diisopropyl amine, malonic acid diethyl ester, acetoacetic acid ethyl ester, epsilon-caprolactam, 3-aminotriazole, 1,2,4-triazole, pyrazole, 3,5-dimethyl pyrazole, acetone oxime, methyl amyl ketoxime, methyl ethyl ketoxime or a mixture thereof. In a further non-limiting embodiment, the blocking compound is chosen from methanol, diisopropyl amine, malonic acid diethyl ester, acetoacetic acid ethyl ester, 1,2,4-triazole, methyl ethyl ketoxime, acetone oxime or a mixture thereof. In a still further non-limiting embodiment, the blocking compound is methanol, diisopropyl amine, methyl ethyl ketoxime, 1,2,4-triazole or a mixture thereof.

In one non-limiting embodiment, the NCO:OH ratio for the monoisocyanate containing material having at least one unsaturated group to the material comprising at least one carbonate group and at least one hydroxyl can range from 1:1 to 1:7, e.g., from 1:2 to 1:6 or from 1:2 to 1:5. The NCO:OH ratio can range between any combination of these values, inclusive of the recited ranges, e.g., from 1:1.5 to 1:6.9.

In another non-limiting embodiment, the molecular weight of the reaction product of at least one material comprising at least one carbonate group and at least one hydroxyl group and at least one monoisocyanate containing material having at least one unsaturated group, e.g., component (a), can vary widely. It can range from the molecular weight of the minimal number of elements used to form the reation product, about 200 grams per mole, to a large polymeric species having a number average molecular weight based on polystyrene standards of 200,000. For example, the molecular weight can range from a number average molecular weight range based on polyethylene glycol standards of from 500 to 17,500 or a number average molecular weight range based on polystyrene standards from 1500 to 100,000. The molecular weight of the reaction product can range between any combination of these values, e.g., from a molecular weight of 250 grams per mole to a number average molecular weight of 150,000. In one contemplated non-limiting embodiment, the molecular weight of component (a) is a number average molecular weight based on polystyrene standards of greater than 2,000.

In a series of non-limiting embodiments, component (a) can be present in the composition in a wide range of amounts, e.g., from 5 to 100 percent by weight based on the total weight of the polymerizable non-photochromic components. Component (a) can be present in the polymerizable composition of the present invention in an amount of at least 5 percent by weight, e.g., in an amount of at least 20 percent by weight, or least 30 percent by weight, the percent weights being based on the total weight of the polymerizable non-photochromic components. Component (a) can be present in the polymerizable composition in an amount of less than 95 percent by weight, e.g., in an amount of less than 75 percent by weight, or less than 50 percent by weight, the percent weights being based on the total weight of the polymerizable non-photochromic components. The amount of component (a) monomer that is present in the polymerizable composition of the present invention can range between any combination of these upper and lower values, inclusive of the recited values, e.g. from 6 to 99 weight percent.

In another series of non-limiting embodiments, the copolymerizable monomer of optional component (b) can be present in the composition of the present invention in a wide range of amounts. The copolymerizable monomer(s) can be present in the polymerizable composition in an amount of at least 5 percent by weight, e.g., in an amount of at least 25 percent by weight, or at least 50 percent by weight, the percent weights being based on the total weight of the polymerizable non-photochromic components. The copolymerizable monomer(s) can be present in the polymerizable composition in an amount of less than 95 percent by weight, e.g., in an amount less than 80 percent by weight, or less than 70 percent by weight, the percent weights being based on the total weight of the polymerizable non-photochromic components. The amount of copolymerizable monomer that is present in the polymerizable composition can range between any combination of these upper and lower values, inclusive of the recited values, e.g., from 10 to 90 weight percent. The weight percent of component (a) and component (b), based on the total weight of the polymerizable non-photochromic components, comprises 100 weight percent.

In one non-limiting embodiment, the first copolymerizable monomer of the polymerizable organic composition of the present invention can be described as (meth)acryloyl terminated carbonates of linear or branched aliphatic polyols, cycloaliphatic polyols, aromatic polyols or polyols comprising ester groups, e.g., aliphatic glycol bis((meth)acryloyl carbonate) monomers, alkylidene bisphenol bis ((meth)acryloyl) carbonate) monomers or polyester bis ((meth)acryloyl carbonate) monomers. Non-limiting methods for preparation of the first monomer are procedures described in U.S. Pat. No. 5,965,680.

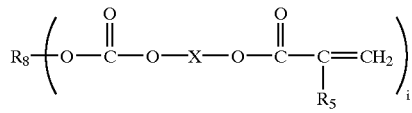

With reference to the above formula, $R_8$ is a polyvalent residue of a polyol, which can be an aliphatic polyol, cycloaliphatic polyol, an aromatic polyol or a polyol comprising ester groups containing at least 2 hydroxy groups, e.g., 3, 4, 5 or 6 hydroxy groups. Polyols having more than 2 hydroxy groups include, for example, glycerol, trimethylol propane, trimethylol ethane, di-trimethylol propane, di-trimethylol ethane, pentaerythritol and di-pentaerythritol. X is a divalent linking group defined hereinbefore, $R_5$ is hydrogen or methyl. In one non-limiting embodiment $R_5$ is methyl, the letter i is an integer from 2 to 6. In another non-limiting embodiment, i is 2.

In a series of non-limiting embodiments, the polyol of which $R_8$ is a residue contains 2 hydroxy groups, i.e., a diol, such as a glycol or bisphenol. The aliphatic polyol can be linear or branched and contain from 2 to 20 carbon atoms. In one non-limiting embodiment, the aliphatic polyol is an alkylene glycol having from 2 to 4 carbons atoms, e.g., ethylene glycol, propylene glycol, trimethylene glycol, tetramethylene glycol, and/or a poly($C_2$–$C_4$) alkylene glycol, e.g., diethylene glycol, triethylene glycol, dipropylene glycol, tripropylene glycol, dibutylene glycol, tributylene glycol, etc.

In a further non-limiting embodiment, the polyol of which $R_8$ is a residue can also be chosen from 1,3-benzene diol, 1,4-benzene diol, hydroxyquinone bis(2-hydroxyethyl)ether or a bisphenol represented by the following formula,

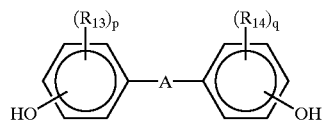

wherein $R_{13}$ and $R_{14}$ are each independently chosen for each occurrence from $C_1$–$C_4$ alkyl, chlorine or bromine; p and q are each independently chosen from an integer from 0 to 4; and —A— is a divalent linking group chosen from —O—, —S—, —S($O_2$)—, —C(O)—, —$CH_2$—, —CH=CH—, —C($CH_3$)$_2$—, —C($CH_3$)($C_6H_5$)— or

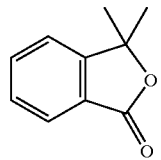

In a still further non-limiting embodiment, cycloaliphatic polyols from which $R_8$ can be chosen include: 1,2-, 1,3- or 1,4-dimethanol cyclohexane, or hydrogenated versions of bisphenols, e.g., biscyclohexanols as described further herein. A non-limiting example of a biscyclohexanol from which $R_8$ can be selected is 4,4'-isopropylidenebiscyclohexanol.

In another non-limiting embodiment of the present invention, the polyol of which $R_8$ is a residue is chosen from alkylene glycol, poly($C_2$–$C_4$) alkylene glycol, glycerol, 1,3-benzene diol, 1,4-benzene diol, hydroxyquinone bis(2-hydroxyethyl)ether diols, or a mixture thereof. In a further non-limiting embodiment, the polyol of which $R_8$ is a residue is chosen from alkylene glycol, e.g., ethylene glycol, or poly($C_2$–$C_4$)alkylene glycol, e.g., diethylene glycol.

Examples of polyol((meth)acryloyl carbonate) monomers from which the first copolymerizable monomer (a) can be chosen include, but are not limited to: ethylene glycol bis((methacryloyloxy)ethylene carbonate), ethylene glycol bis((acryloyloxy)ethylene carbonate), diethylene glycol bis ((methacryloyloxy)ethylene carbonate), diethylene glycol bis((acryloyloxy)ethylene carbonate), triethylene glycol bis ((methacryloyloxy)ethylene carbonate), triethylene glycol bis((acryloyloxy)ethylene carbonate), propylene glycol bis ((methacryloyloxy)ethylene carbonate), propylene glycol bis((acryloyloxy)ethylene carbonate), 1,3-propanediol bis ((methacryloyloxy)ethylene carbonate), 1,3-propanediol bis ((acryloyloxy)ethylene carbonate), 1,3-butanediol bis ((methacryloyloxy)ethylene carbonate), 1,3-butanediol bis ((acryloyloxy)ethylene carbonate), 1,2- and 1,3-glycerol bis ((methacryloyloxy)ethylene carbonate), 1,2- and 1,3-glycerol bis((acryloyloxy)ethylene carbonate), 1,4 butanediol bis((methacryloyloxy)ethylene carbonate), 1,4 butanediol bis((acryloyloxy)ethylene carbonate), dipropylene glycol bis((methacryloyloxy)ethylene carbonate), dipropylene glycol bis((acryloyloxy)ethylene carbonate), trimethyleneglycol bis((methacryloyloxy)ethylene carbonate), trimethyleneglycol bis((acryloyloxy)ethylene carbonate), pentamethylene glycol bis((methacryloyloxy)ethylene carbonate), pentamethylene glycol bis((acryloyloxy)ethylene carbonate), 1,3- and 1,4-benzene diol bis((methacryloyloxy)ethylene carbonate), 1,3- and 1,4-benzene diol bis ((acryloyloxy)ethylene carbonate), hydroxyquinone bis(2-hydroxyethyl)ether bis((methacryloyloxy)ethylene carbonate), hydroxyquinone bis(2-hydroxyethyl)ether bis ((acryloyloxy)ethylene carbonate), isopropylidene bisphenol bis((methacryloyloxy)ethylene carbonate), isopropylidene bisphenol bis((acryloyloxy)ethylene carbonate), diethyleneglycol bis((methacryloyloxy)2-methyl-ethylene carbonate), diethyleneglycol bis((methacryloyloxy)1,4-cyclohexylene carbonate), diethyleneglycol bis((methacryloyloxy)1,4-phenylene carbonate), diethyleneglycol bis((methacryloyloxy)2,5-dimethyl-1,3-phenylene carbonate) or a mixture thereof.

In a further non-limiting embodiment, the polyol of which $R_8$ is a residue of is a polyol comprising ester groups. Such polyols are generally known and can have a number average molecular weight in the range of from 200 to 10,000. They can be prepared by conventional techniques utilizing low molecular weight diols, i.e., diols having a molecular weight of 500 grams per mole or less, triols and polyhydric alcohols known in the art, (optionally in combination with monohydric alcohols) with polycarboxylic acids. Non-limiting examples of polycarboxylic acids include: phthalic acid, isophthalic acid, terephthalic acid, trimellitic acid, tetrahydrophthalic acid, adipic acid, succinic acid, glutaric acid, fumaric acid, or mixtures thereof. Anhydrides of the above acids, where they exist, can also be employed and are encompassed by the term "polycarboxylic acid".

In a still further non-limiting embodiment, certain materials which react in a manner similar to acids to form polyester polyols are also useful. Such materials include lactones, e.g., caprolactone, propiolactone and butyrolactone, and hydroxy acids such as hydroxycaproic acid and dimethylol propionic acid. If a triol or polyhydric alcohol is used, a monocarboxylic acid, such as acetic acid and/or benzoic acid, can be used in the preparation of the polyester polyols, and for some purposes, such a polyester polyol can be desirable. Moreover, polyester polyols are understood herein to include polyester polyols modified with fatty acids or glyceride oils of fatty acids (i.e., conventional alkyd polyols containing such modification). Other non-limiting examples of polyester polyols which can be utilized are those prepared by reacting an alkylene oxide, e.g., ethylene oxide, propylene oxide, etc., and the glycidyl esters of versatic acid with methacrylic acid to form the corresponding ester.

In one non-limiting embodiment, when $R_8$ is the residue of a polyol comprising ester groups, the polyol from which it is a residue can be represented by the following formula:

wherein: Y is —O— or —NR— and R is hydrogen or $C_1$–$C_{12}$ alkyl; $R_1$ is an organic radical derived from an initiator. Initiators are compounds having at least one reactive hydrogen capable, with or without the aid of a catalyst, of opening the lactone ring and adding it as an open chain without forming water of condensation. Non-limiting examples of initiators include monofunctional initiators such as alcohols and amines, and polyfunctional initiators such as polyols, polyamines, aminoalcohols, and vinyl polymers, as well as amides, sulfonamides, hydrozones, semicarbazones, oximes, polycarboxylic acids, hydroxy carboxylic acids and amino-carboxylic acids. $R_2$, $R_3$ and $R_4$ are each chosen independently for each occurrence from hydrogen, $C_1$–$C_{12}$ alkyl, $C_5$–$C_6$ cycloalkyl, $C_1$–$C_6$ alkoxy, benzyl or phenyl, provided that at least h+2 of the total number of $R_2$, $R_3$ and $R_4$ are hydrogen. For example, when butyrolactone ($C_4H_6O_2$) is the starting material, h is 2 and at least 4, actually 5 of the total number of $R_2$, $R_3$ and $R_4$ are hydrogen. The letter h is chosen from an integer from 1 to 6; t is chosen from an integer from 1 to 100; and y is chosen from an integer equal to from 2 to 6.

In another non-limiting embodiment, the polyol comprising ester groups is the reaction product of a diol initiator and a lactone, i.e., a polylactone diol. The diol of the polylactone diol can be chosen from linear or branched aliphatic diols having from 2 to 20 carbon atoms, poly($C_2$–$C_4$)alkylene glycols, cycloaliphatic diols having from 5 to 8 carbon atoms in the cyclic ring, monocyclic aromatic diols, bisphenols, hydrogenated bisphenols or a mixture thereof.

Examples of linear or branched aliphatic diols having from 2 to 20 carbon atoms that can be used to prepare the polylactone diol include, but are not limited to, the diols of which $R_8$ is a residue. Non-limiting examples of such diols include: ethylene glycol, propylene glycol, 1,3-propane diol, 1,2- and 2,3-butane diol, pentane diols, hexane diols, heptane diols, octane diols, nonane diols, decane diols, undecane diols, dodecane diols, tridecane diols, tetradecane diols, pendadecane diols, hexadecane diols, hetadecane diols, octadecane diols, nonadecane diols and icosane diols. Examples of poly($C_2$–$C_4$)alkylene glycols include, but are not limited to, di-, tri-, tetra-, penta- and higher ethylene glycols, di-, tri-, tetra-, penta- and higher propylene glycols, and di-, tri-, tetra-, penta- and higher butylene glycols.

Cycloaliphatic diols having from 5 to 8 carbon atoms that can be used to prepare the polylactone diol include, but are not limited to, those cycloaliphatic diols described previously herein, cyclopentane diol, cyclohexane diol, cyclohexane dimethanol, cycloheptane diol and cyclooctane diol. Examples of monocyclic aromatic diols that can be used to prepare the polylactone diol include but are not limited to, benzene diol, e.g., 1,2-dihydroxy benzene and 1,3-dihydroxy benzene; $C_1$–$C_4$ alkyl substituted benzene diol, e.g., 4-tert-butyl-benzene-1,2-diol, 4-methyl-benzene-1,2-diol, 3-tert-butyl-5-methyl-benzene-1,2-diol and 3,4,5,6-tetramethyl-benzene-1,2-diol; halo substituted benzene diol, e.g., 3,5-dichlorobenzene-1,2-diol, 3,4,5,6-tetrabromo-benzene-1,2-diol and 3,4,5-trichloro-benzene-1,2-diol; and $C_1$–$C_4$ alkyl and halo substituted benzene diol, e.g., 3-bromo-5-tert-butyl-benzene-1,2-diol, 3,6-dichloro-4-methyl-benzene-1,2-diol, 3,-bromo-4,5-dimethyl-benzene-1,2-diol or 3-chloro-4,6-di-tert-butyl-benzene-1,2-diol.

In one non-limiting embodiment, bisphenols and hydrogenated bisphenols that can be used to prepare the polylactone diol can be represented by the following formula:

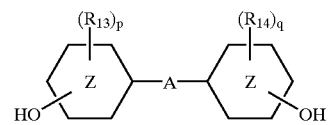

wherein $R_{13}$ and $R_{14}$ are each independently chosen for each occurrence from $C_1$–$C_4$ alkyl, chlorine or bromine; p and q are each independently chosen from an integer from 0 to 4; and —A— is a divalent linking group chosen from —O—, —S—, —S(O$_2$)—, —C(O)—, —CH$_2$—, —CH=CH—, —C(CH$_3$)$_2$—, —C(CH$_3$)(C$_6$H$_5$)— or

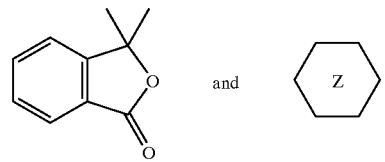

and represents a benzene ring or a cyclohexane ring. A non-limiting example of a bisphenol that can be used to prepare the polylactone diol is 4,4'-isopropylidenebisphenol. A non-limiting example of a hydrogenated bisphenol that can be used to prepare the polylactone diol is 4,4'-isopropylidenebiscyclohexanol.

In one non-limiting embodiment, the lactone used to prepare the polylactone diol has from 3 to 8 carbon atoms in the cyclic lactone ring and can be represented by the following formula,

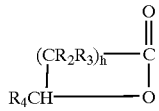

wherein h is chosen from an integer from 1 to 6, e.g., 1, 2, 3, 4, 5 or 6, $R_2$, $R_3$ and $R_4$ are each chosen independently for each occurrence from hydrogen, $C_1$–$C_{12}$ alkyl, $C_5$–$C_6$ cycloalkyl, $C_1$–$C_6$ alkoxy, benzyl or phenyl, provided that at least h+2 of the total number of $R_2$, $R_3$ and $R_4$ groups are hydrogen. In another non-limiting embodiment, each of $R_2$, $R_3$ and $R_4$ are each hydrogen.

Examples of lactones that can be used to prepare the polylactone diol include, but are not limited to: beta-propiolactone; gamma-butyrolactone; beta-butyrolactone; delta-valerolactone; alpha-methyl-gamma-butyrolactone; beta-methyl-gamma-butyrolactone; gamma-valerolactone; epsilon-caprolactone; monomethyl-, monoethyl-, monopropyl-, monoisopropyl- etc. through monododecyl epsilon-caprolactones; methoxy and ethoxy epsilon-caprolactones; cyclohexyl epsilon-caprolactones; phenyl epsilon-caprolactones; benzyl epsilon-caprolactones; zeta-enatholactone; and eta-caprylactone. In one non-limiting embodiment of the present invention, $R_2$, $R_3$ and $R_4$ are each hydrogen, h is 4 and the lactone is epsilon-caprolactone.

In one non-limiting embodiment, the second copolymerizable monomer can be represented by the following formula:

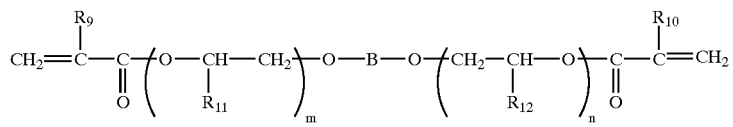

wherein m and n are each independently chosen from an integer from 0 to 6, the sum of m and n being from 0 to 6, $R_9$ and $R_{10}$ are each independently chosen from hydrogen or methyl, $R_{11}$ and $R_{12}$ are each independently chosen for each occurrence from hydrogen or $C_1$ to $C_2$ alkyl, and B is a divalent linking group chosen from straight or branched chain alkylene, phenylene, $C_1$–$C_4$ alkyl substituted phenylene, or a group represented by the following formula,

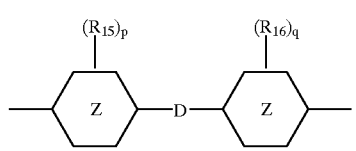

wherein $R_{15}$ and $R_{16}$ are each independently chosen for each occurrence from $C_1$–$C_4$ alkyl, chlorine or bromine, p and q are each chosen from an integer from 0 to 4,

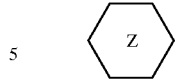

represents a divalent benzene group or a divalent cyclohexane group and D is —O—, —S—, —S($O_2$)—, —C(O)—, —$CH_2$—, —CH=CH—, —C($CH_3$)$_2$—, —C($CH_3$)($C_6H_5$)— or

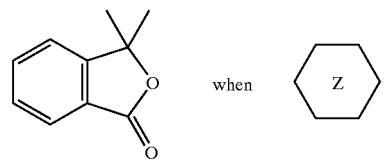

is the divalent benzene group, and D is —O—, —S—, —$CH_2$—, or —C($CH_3$)$_2$— when

is the divalent cyclohexane group.

In one non-limiting embodiment, B is a divalent linking group represented by the following formula,

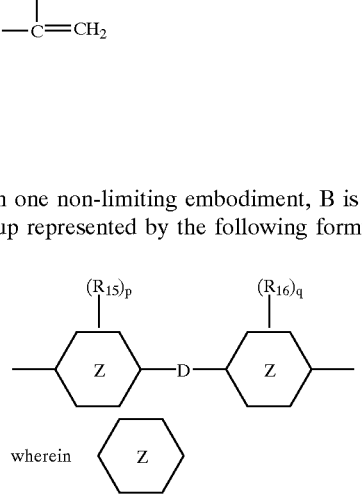

represents a benzene group.

In another non-limiting embodiment, $R_9$ and $R_{10}$ are each methyl, $R_{11}$, and $R_{12}$ are each hydrogen, p, q, r and s are each 0, D is —C($CH_3$)$_2$— and the sum of m and n is chosen from 0 to 4.

In one non-limiting embodiment, the copolymerizable monomer can be represented by the following formula:

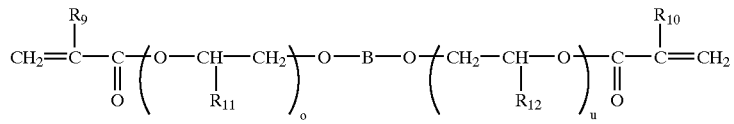

wherein o and u are each independently chosen from a positive number, the sum of o and u being chosen from 7 to 70, $R_9$, $R_{10}$, $R_{11}$, $R_{12}$ and B are the same as defined hereinbefore.

In another non-limiting embodiment, the sum of o and u is from 10 to 30.

In one non-limiting embodiment, the copolymerizable monomer can be represented by the following formula:

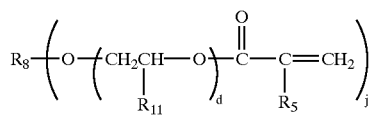

wherein $R_5$, $R_8$ and $R_{11}$ are the same as defined hereinbefore, d is chosen from a number from 0 to 20, and j is chosen from a number from 3 to 6.

In another non-limiting embodiment, d is from 3 to 15 and the polyol from which $R_8$ is derived is trimethylolpropane, pentaerythritol or dipentaerythritol. In a further non-limiting embodiment, d is from 5 to 10.

In one non-limiting embodiment, the copolymerizable monomer can be the reaction product of a polycarbonate polyol polychloroformate and a hydroxy(meth)acrylate. It can be prepared by a method comprising:

(a) preparing a chloroformate intermediate of the polyol comprising carbonate group(s); and (b) reacting the chloroformate groups of the chloroformate intermediate with a hydroxy(meth)acrylate.

Preparation of the chloroformate intermediates and the subsequent reaction with hydroxy functional (meth)acrylate can be conducted in accordance with art-recognized methods. As is known to the skilled artisan, the reaction of chloroformate groups with a hydroxy functional (meth) acrylate is typically performed in the presence of an acid scavenger, e.g., an alkali metal hydroxide, followed by washing and isolation of the resulting mixture of polyol ((meth)acryloyl carbonate) monomers. While the molar equivalents ratio of hydroxy functional (meth)acrylate to chloroformate groups of the mixture of chloroformate intermediates in step (b) can be less than 1:1, in one non-limiting embodiment it is at least 1:1 (i.e., all of the chloroformate groups are reacted with hydroxy (meth)acrylate). In step (b) of the method, the molar equivalents ratio of hydroxy (meth)acrylate to chloroformate groups can be from 1:1 to 1.5:1.0, e.g., 1.1:1.0.

In one non-limiting embodiment, the copolymerizable monomer can also be prepared by a method comprising reacting the hydroxy groups of the polyol comprising carbonate groups with a chloroformate functional (meth)acrylate represented by the following formula:

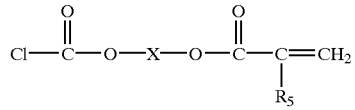

wherein X and $R_5$ are each as described previously herein.

The chloroformate functional (meth)acrylate represented by the aforementioned formula can be prepared by methods that are well known to the skilled artisan. In one non-limiting embodiment, a hydroxy functional (meth)acrylate, such as 2-hydroxyethyl(meth)acrylate, is reacted with phosgene in a molar equivalents ratio such that the chloroformate functional (meth)acrylate represented by the aforementioned formula is formed.

In one non-limiting embodiment, the reaction of the hydroxy groups of the polyol(s) with the chloroformate groups of the chloroformate functional (meth)acrylate is performed in the presence of an acid scavenger, e.g., an alkali metal hydroxide, followed by washing and isolation of the resulting mixture of polyol((meth)acryloyl carbonate) monomers (as is known to the skilled artisan). While the molar equivalents ratio of hydroxy groups of the mixture of polyols to chloroformate groups of the chloroformate functional (meth)acrylate can vary widely, in one non-limiting embodiment, it is chosen such that all of the hydroxy groups of the mixture of polyols are reacted with chloroformate functional (meth)acrylate, i.e., a molar equivalents ratio of less than or equal to 1:1, e.g., from 0.5:1 to 1:1.

In another non-limiting embodiment, the fifth copolymerizable monomer can be prepared by reacting a polyol (in excess) with (meth)acryloyl chloride followed by washing and isolation of the monofunctional methacrylate. This material is reacted with phosgene to form a chloroformate intermediate that is subsequently reacted with a polyol comprising at least one carbonate group.

In one non-limiting embodiment, the copolymerizable monomer can be prepared by reacting a polycarbonate polyol with (meth)acryloyl chloride (in excess) followed by washing and isolation of polycarbonate polyol(meth)acrylate.

In one non-limiting embodiment, the copolymerizable monomer is a monoethylenically unsaturated monomer that is polymerizable by free radical initiation. The monoethylenically unsaturated monomer can be chosen from an alkyl ester of (meth)acrylic acid, vinyl aromatic monomer, vinyl halide, vinylidene halide, vinyl ester, (meth)acryloxypropyltri($C_1$–$C_4$)alkoxysilane, (meth)acrylic acid or a mixture thereof.

In another non-limiting embodiment, the monoethylenically unsaturated monomer can be chosen from stearyl methacrylate, methyl methacrylate, isobornyl methacrylate, phenoxyethyl methacrylate, cyclohexyl methacrylate, styrene, vinyl toluene, acrylonitrile, methacrylonitrile, vinyl chloride, vinylidene fluoride, vinyl acetate, vinyl propionate, vinyl butyrate, vinyl larerate, vinyl pyrrolidinorol, vinyl benzoate, methacryloxypropyltrimethoxysilane or a mixture thereof.

In one non-limiting embodiment, the copolymerizable monomer is an allyl functional monomer having at least two allyl groups. The allyl functional monomer can be used in the polymerizable composition at a level that does not exceed 5 weight percent, based on the total weight of the monomers. In another non-limiting embodiment, the allyl functional monomer is chosen from:

(i) an allyl functional monomer represented by the following formula,

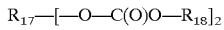

wherein $R_{17}$ is a divalent residue of a diol chosen from 1,2-ethane diol diethylene glycol or 1,2-propane diol, and $R_{18}$ is an allyl group;

(ii) an allyl functional monomer represented by the following formula:

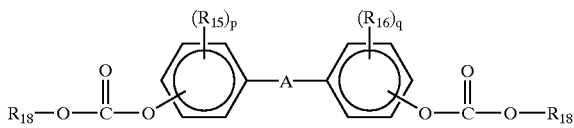

wherein $R_{15}$ and $R_{16}$ are each independently chosen for each occurrence from each other from $C_1$–$C_4$ alkyl, chlorine or bromine, p and q are each independently chosen from an integer from 0 to 4, and -A- is a divalent linking group chosen from —O—, —S—, —S($O_2$)—, —C(O)—, —$CH_2$—, —CH=CH—, —C($CH_3$)$_2$—, —C($CH_3$)($C_6H_5$)— or

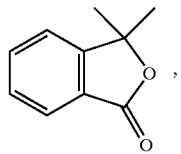

and $R_{18}$ is an allyl group;

(iii) an allyl functional monomer represented by the following formula:

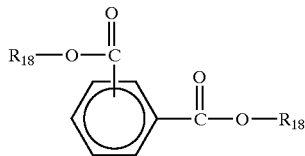

wherein $R_{18}$ is an allyl group; or (iv) a mixture of at least two of (i), (ii) and (iii).

In a further non-limiting embodiment, the allyl functional monomer is chosen from:

(i) polyether diol bis(allyl carbonate);
(ii) polylactone diol bis(allyl carbonate); or
(iii) a mixture thereof.

In one non-limiting embodiment, polymerization of the polymerizable composition of the present invention can occur by mechanisms described in the definition of "polymerization" in *Hawley's Condensed Chemical Dictionary* Thirteenth Edition, 1997, John Wiley & Sons, pages 901–902. Those mechanisms include by "addition", in which free radicals are the initiating agents that react with the double bond of the monomer by adding to it on one side at the same time producing a new free electron on the other side, by "condensation", involving the splitting out of water molecules by two reacting monomers and by so-called "oxidative coupling"

In a further non-limiting embodiment, polymerization of the polymerizable organic composition of the present invention can be accomplished by adding to the composition an initiating amount of material capable of generating free radicals, such as organic peroxy compounds or azobis(organonitrile) compounds, i.e., an initiator. Methods for polymerizing polyol((meth)acryloyl carbonate) monomer compositions are well known to the skilled artisan and any of those well known techniques can be used to polymerize the aforedescribed polymerizable organic compositions. Such polymerization methods include thermal polymerization, photopolymerization or a combination thereof.

Non-limiting examples of organic peroxy compounds, that can be used as thermal polymerization initiators include: peroxymonocarbonate esters, such as tertiarybutylperoxy isopropyl carbonate; peroxydicarbonate esters, such as di(2-ethylhexyl)peroxydicarbonate, di(secondary butyl)peroxydicarbonate and diisopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide and p-chlorobenzoyl peroxide; peroxyesters such as t-butylperoxy pivalate, t-butylperoxy octylate and t-butylperoxyisobutyrate; methylethylketone peroxide, and acetylcyclohexane sulfonyl peroxide. In one non-limiting embodiment the thermal initiators used are those that do not discolor the resulting polymerizate.

Non-limiting examples of azobis(organonitrile) compounds, that can be used as thermal polymerization initiators include: azobis(isobutyronitrile), azobis(2,4-dimethylvaleronitrile) or a mixture thereof.

The amount of thermal polymerization initiator used to initiate and polymerize the polymerizable organic compositions of the present invention can vary and will depend on the particular initiator used and the intended photochromic article, e.g., cast lens, coated lens or overmold. Only that amount that is required to initiate and sustain the polymerization reaction is required, i.e., an initiating amount. With respect to the peroxy compound, diisopropyl peroxydicarbonate, used in one non-limiting embodiment, the amount is typically between 0.01 and 3.0 parts of that initiator per 100 parts of the polymerizable organic composition (phm). In another non-limiting embodiment, between 0.05 and 1.0 phm is used to initiate the polymerization. The thermal cure cycle involves heating the polymerizable organic composition in the presence of the initiator, in one non-limiting embodiment, from room temperature to 85° C. to 125° C. over a period of from 2 hours to 30 hours.

In one non-limiting embodiment, photopolymerization of the polymerizable organic composition according to the present invention can be carried out in the presence of a photopolymerization initiator using ultraviolet light, visible light, or a combination thereof. Non-limiting examples of photopolymerization initiators include benzoin, benzoin methyl ether, benzoin isobutyl ether benzophenol, acetophenone, 4,4'-dichlorobenzophenone, diethoxyacetophenone, 2-hydroxy-2-methyl-1-phenylpropan-1-one, 1-hydroxycyclohexyl phenyl ketone, 2-isopropylthixantone and 2,4,6-trimethylbenzoyldiphenylphosphine oxide. The amount of photopolymerization initiator used to initiate and polymerize the polymerizable organic compositions of the present invention can vary and will depend on the particular initiator used and the intended photochromic article to be produced. Only that amount that is required to initiate and sustain the polymerization reaction is required, i.e., an initiating amount. In one non-limiting embodiment, the photopolymerization initiator is used in an amount from 0.01 percent to 5 percent by weight, based on the weight of monomer components.

In one non-limiting embodiment, the light source used for the photopolymerization is chosen from those which emit ultraviolet light. The light source can be a mercury lamp, a germicidal lamp or a xenon lamp. Visible light, e.g., sunlight, can also be used. The exposure time may differ depending upon, e.g., the wavelength and intensity of the light source and the particular photochromic article, and is typically determined empirically.

In another non-limiting embodiment, various conventional additives can be incorporated with the polymerizable organic composition of the present invention. Such additives can include light stabilizers, heat stabilizers, antioxidants, ultraviolet light absorbers, mold release agents, static (non-photochromic) dyes, pigments, solvents and polymerization inhibitors to promote stability during storage, and ultraviolet light absorbers (other than the photochromic compounds). Antiyellowing additives, e.g., 3-methyl-2-butenol, organo pyrocarbonates and triphenyl phosphite [CAS 101-02-0], can also be added to polymerizable organic compositions of the present invention to enhance resistance to yellowing.

In a further non-limiting embodiment, it is also contemplated that a polymerization moderator, or mixtures of polymerization moderators, can be added to the polymerizable organic composition of the present invention to minimize the formation of distortions, such as striations, in polymerizates obtained therefrom. Non-limiting examples of polymerization moderators include: dilauryl thiodipropionate, terpinolene, 1-isopropyl-4-methyl-1,4-cyclohexadiene, 1-isopropyl-4-methyl-1,3-cyclohexadiene, 1,3-diisopropenylbenzene, alpha-methyl styrene, 2,4-diphenyl-4-methyl-1-pentene, 1,1-diphenylethylene, cis-1,2-diphenylethylene, 2,6-dimethyl-2,4,6-octatriene, 4-tert-butylpyrocatechol, 3-methyl-2-butenol or a mixture thereof.

In one non-limiting embodiment, the polymerization moderator can be added to the polymerizable organic composition of the present invention in an amount from 0.01 percent to 20 percent by weight, e.g., from 0.1 percent to 10 percent by weight or from 0.3 percent to 5 percent by weight, based on the total weight of the polymerizable organic composition. The amount of polymerization moderator can range between any combination of these values, inclusive of the recited ranges, e.g. from 0.015 to 19.999 weight percent.

In one non-limiting embodiment, the polymerizates obtained from polymerization of polymerizable organic compositions of the present invention are solid and transparent or optically clear so that they can be used as optical elements, e.g., optical lenses, such as plano and ophthalmic lenses and contact lenses, sun lenses, windows, automotive transparencies, e.g., windshields, T-roofs, sidelights and backlights, and for aircraft transparencies, etc. In another non-limiting embodiment, the polymerizate can have a thickness of 0.5 millimeters or more.

In another non-limiting embodiment, a glass two-part lens mold is filled with the polymerizable composition, which may additionally contain a catalytic amount of azobis isobutyronitrile. The glass mold is sealed and placed in an oven. A thermal polymerization cycle is initiated, which can range from 10 to 20 hours duration at about 40 to 110° C. Afterwards, the mold is opened and the resulting lens, i.e., polymerizate, is removed. The polymer lens thus produced is then annealed for a period and at a temperature sufficient to eliminate residual stresses in the lens. The temperature is generally between 100 and 110° C. and annealing is carried out for 1 to 5 hours. If the photochromic material was not included in the polymerizable composition, it can be incorporated into the polymerizate by imbibition, permeation or other transfer methods known to those skilled in the art.

In a further non-limiting embodiment, a semi-finished single vision (SFSV) lens having an adherent casting of the photochromic polymerizable composition of the present invention can be prepared by an overmolding process. Typically, a predetermined volume of the photochromic polymerizable composition is dispensed into a volume defined by a spherical concave or minus glass mold, which approximately matches the front surface curve and the outer diameter of a SFSV lens. The glass mold is fitted with a circular polyvinyl chloride gasket that extends approximately 0.2 millimeters above the mold and has an inside diameter approximately 4 millimeters less than outside diameter of the glass mold. After the monomer is dispensed, the SFSV lens is carefully placed on the dispensed polymerizable composition which spreads to fill the defined volume. A circular glass plate having an outside diameter equal to or greater than that of the lens is placed onto the rear surface of the lens. A spring clamp is positioned so that one side of the clamp is on the front surface of the negative mold and other side of the clamp is on the back surface of the glass plate. The resulting assembly is sealed by taping the circumference of the plate-lens-gasket-mold using polyurethane tape. The assembly is preheated in an air oven from 30 to 95° C. for a 60 minute interval and subsequently the temperature is increased from 95 to 125° C. and decreased to 82° C. over a 3 hour interval. The assembly is separated by inserting a wedge beneath the gasket between the lens and mold. The lens now has an adherent casting of from 150 to 180 microns.

When polymerizates of the present invention are used as a matrix for photochromic compounds, e.g., as photochromic articles, such as photochromic lenses, in one non-limiting embodiment, the polymerizate should be transparent to that portion of the electromagnetic spectrum which activates the photochromic substance(s) in the matrix, e.g., that wavelength of ultraviolet (UV) light that produces the colored or open form of the photochromic substance and that portion of the visible spectrum that includes the absorption maximum wavelength of the photochromic substance in its UV activated form, e.g., the open form.

In various non-limiting embodiments, a photochromic article can be prepared by injecting the polymerizable composition of the present invention into a mold and polymerizing it by what, for example, is commonly referred to in the art as a cast-in-place process. Polymerizates, e.g., lenses, prepared by cast polymerization of polymerizable compositions of the present invention (in the absence of a photochromic amount of an organic photochromic substance), can be used to prepare photochromic articles by applying or incorporating photochromic compounds into the polymerizate by art-recognized methods. Such non-limiting art-recognized methods include: (a) dissolving or dispersing the photochromic substance within the polymerizate, e.g., imbibition of the photochromic substance into the polymerizate by immersion of the polymerizate in a hot solution of the photochromic substance or by thermal transfer; (b) providing the photochromic substance as a separate layer between adjacent layers of the polymerizate, e.g., as a part of a polymer film; and (c) applying the photochromic substance as part of a coating placed on the surface of the polymerizate. The term "imbibition" or "imbibe" is intended to mean and include permeation of the photochromic substance alone into the polymerizate, solvent assisted transfer absorption of the photochromic substance into a polymerizate, vapor phase transfer, and other such transfer mechanisms.

Non-limiting examples of photochromic compounds that can be utilized with the polymerizable compositions of the present invention are organic photochromic compounds that color to a desired hue. They typically have at least one activated absorption maxima within the range of between about 400 and 700 nanometers. They can be used individually or may be used in combination with photochromic compounds that complement their activated color.

In one non-limiting embodiment, the organic photochromic materials include chromenes, e.g., naphthopyrans, benzopyrans, indenonaphthopyrans and phenanthorpyrans; spiropyrans, e.g., spiro(benzindoline)naphthopyrans, spiro(indoline)benzopyrans, spiro(indoline)naphthopyrans, spiro(indoline)quinopyrans and spiro(indoline)pyrans; oxazines, e.g., spiro(indoline)naphthoxazines, spiro(indoline)pyridobenzoxazines, spiro(benzindoline)pyridobenzoxazines, spiro(benzindoline)naphthoxazines and spiro(indoline)benzoxazines; mercury dithizonates, fulgides, fulgimides and mixtures of such photochromic compounds. Such photochromic compounds are described in U.S. Pat. Nos. 5,645,767 6,153,126 and 6,296,785B1 at column 30, line 44 to column 31, line 5.

In another non-limiting embodiment, the photochromic compounds described herein are used in photochromic amounts and in a ratio (when mixtures are used) such that a coating composition to which the compound(s) is applied or in which it is incorporated exhibits a desired resultant color, e.g., a substantially neutral color such as shades of gray or brown when activated with unfiltered sunlight, i.e., as near a neutral color as possible given the colors of the activated photochromic compounds. Neutral gray and neutral brown colors are preferred; however, other fashionable colors may be used. Further discussion of neutral colors and ways to describe colors can be found in U.S. Pat. No. 5,645,767 column 12, line 66 to column 13, line 19.

As used herein and in the claims, by "photochromic amount" is meant that amount of photochromic compound or substance which is at least sufficient to produce a photochromic effect discernible to the naked eye upon activation. Stated another way, for imbibed substances a photochromic amount is a "photochromically effective amount" of an at least partially imbibed photochromic material. The particular amount used depends often upon the intensity of color desired upon irradiation thereof. In one non-limiting embodiment, the more photochromic substance present in the polymerizable composition of the present invention or that which is incorporated into a polymerizate of the present invention, the greater the color intensity of the resulting photochromic article.

The amount of photochromic material incorporated into the polymerizable composition, in one non-limiting embodiment, ranges from 0.01 to 40 weight percent based on the weight of the polymerizable composition. For example, the concentration of photochromic material can range from 0.05 to 30 weight percent, or from 0.1 to 20 weight percent or from 0.2 to 15 weight percent, e.g., from 7 to 14 weight percent, based on the weight of the polymerizable composition. The concentration of photochromic material can range between any combination of these values, inclusive of the recited ranges, e.g., from 0.05 to 39.95 weight percent.

When incorporated, e.g., by imbibition, into an optically clear polymerizate of the present invention, the amount of photochromic substance applied to the surface of the optically clear polymerizate can range, in one non-limiting embodiment, from 0.01 to 2.00, e.g., from 0.1 to 1.0, milligram per square centimeter of polymerizate surface area. The concentration of photochromic material can range between any combination of these values, inclusive of the recited ranges, e.g., from 0.015 to 1.999 milligram per square centimeter of polymerizate surface area.

In one non-limiting embodiment, compatible (chemically and color-wise) tints, i.e., dyes, can be added to the polymerizable composition or applied to the polymerizate to achieve a more aesthetic result, for medical reasons, or for reasons of fashion. The particular dye selected will vary and depend on the aforesaid need and result to be achieved. In one non-limiting embodiment, the dye can be selected to complement the color resulting from the activated photochromic substances, e.g., to achieve a more neutral color or absorb a particular wavelength of incident light. In another non-limiting embodiment, the dye can be selected to provide a desired hue to the polymerizate when the photochromic substances are in an unactivated state.

In various non-limiting embodiments, adjuvant materials can also be incorporated into the polymerizable composition with the photochromic material used, prior to, simultaneously with or subsequent to application or incorporation of the photochromic material in the polymerizable composition or cured polymerizate. For example, ultraviolet light absorbers can be admixed with photochromic substances before their addition to the composition or such absorbers can be superposed, e.g., superimposed, as a layer between the photochromic polymerizate and the incident light. Further, stabilizers can be admixed with the photochromic substances prior to their addition to the composition to improve the light fatigue resistance of the photochromic substances. Stabilizers, such as hindered amine light stabilizers (HALS), asymmetric diaryloxalamide (oxanilide) compounds and singlet oxygen quenchers, e.g., a nickel ion complex with an organic ligand, polyphenolic antioxidants or mixtures of such stabilizers are contemplated. They can be used alone or in combination. Such stabilizers are described in U.S. Pat. Nos. 4,720,356, 5,391,327 and 5,770,115.

The polymerizable composition of the present invention can further comprise additional conventional ingredients which impart desired characteristics to the composition, or which are required for the process used to apply and cure the composition or which enhance the cured polymerizates made therefrom. Such ingredients can be used in an amount up to 20 weight percent, based on the weight of the monomers. For example, plasticizers may be used to adjust the Fischer microhardness and/or photochromic performance properties of the photochromic polymerizable composition. Other such additional ingredients comprise rheology control agents, leveling agents, e.g., surfactants, initiators, cure-inhibiting agents, free radical scavengers, cross linking agents and adhesion promoting agents.

Non-limiting examples of adhesion promoting agents such as organofunctional trialkoxysilanes having an alkoxy substituent of 1 to 4 carbon atoms and the polymerizable organofunctional silanes applied using the process disclosed in U.S. Pat. No. 6,150,430 at column 2, line 39 to column 8, line 38 can be used. These materials include, but are not limited to: γ-glycidoxypropyltrimethoxysilane, γ-aminopropyltrimethoxysilane, methacryloxypropyltrimethoxysilane, vinyltriacetoxysilane, 3,4-epoxycyclohexylethyltrimethoxysilane, aminoethyltrimethoxysilane or a mixture thereof. Adhesion promoting agents can be used in an amount that improves the adhesion of a subsequently applied coating to the polymerizate of the present invention or an overmolding of the polymerizable composition to a lens blank. An adhesion improving amount of adhesion promoting agents is an amount that demonstrates an improved adhesion rating as measured by ASTM D-3359-Standard Test Method for Measuring Adhesion by Tape Test-Method B when compared to a polymerizate without the adhesion promoter.

The use of protective coatings, some of which can contain polymer-forming organosilanes, as primers to improve adhesion of subsequently applied coatings has been described in U.S. Pat. No. 6,150,430. In one non-limiting embodiment, non-tintable coatings are used. Non-limiting examples of commercial coating products include SIL-VUE® 124 and HI-GARD® coatings, available from SDC Coatings, Inc. and PPG Industries, Inc., respectively. In addition, depending on the intended use of the article, in one non-limiting embodiment, it can be necessary to apply an appropriate protective coating(s), i.e., an abrasion resistant coating and/or coatings that serve as oxygen barriers, onto the exposed surface of the polymerizate to prevent scratches from the effects of friction and abrasion and interactions of oxygen with the photochromic compounds, respectively. In some cases, the primer and protective coatings are interchangeable, i.e., the same coating can be used as the primer and the protective coating(s). Non-limiting examples of hardcoats include those based on inorganic materials such as silica, titania and/or zirconia as well as organic hardcoats of the type that are ultraviolet light curable.

In additional non-limiting embodiments, other coatings or surface treatments, e.g., a tintable coating, antireflective surface, etc., can also be, applied to the articles of the present invention i.e., photochromic polymerizates. An antireflective coating, e.g., a monolayer or multilayer of metal oxides, metal fluorides, or other such materials, can be deposited onto the photochromic articles, e.g., lenses, of the present invention through vacuum evaporation, sputtering, or some other method.

One contemplated non-limiting embodiment, is the use of the photochromic polymerizable composition of the present invention to produce optically clear polymerizates, i.e., materials suitable for optical applications, such as optical elements, e.g., plano and vision correcting ophthalmic lenses and contact lenses, windows, clear polymeric films, automotive transparencies, e.g., windshields, aircraft transparencies, plastic sheeting, etc. Such optically clear polymerizates may have a refractive index that may range from 1.48 to 2.00, e.g., from 1.495 to 1.75, particularly from 1.50 to 1.66.

Another contemplated non-limiting embodiment, is the use of a combination of the photochromic polymerizate of the present invention with appropriate protective coating(s) such as an organosilane, if necessary, to produce photochromic optical articles.

The present invention is more particularly described in the following examples which are intended as illustration only, since numerous modifications and variations therein will be apparent to those skilled in the art.

Components 1, 2 and 3 along with the Photochromic Component and various methacrylate monomers were used to produce Examples 1 through 14. Example 15 describes the preparation and testing of the photochromic lenses of the examples and the results of that testing done according to the Accelerated Weathering Photochromic Percent Photopic Fatigue Test.

Component 1

The reaction product of an isocyanate and a polycarbonate polyol was prepared from the ingredients as summarized in Table 1.

TABLE 1

| Ingredients | Weight (grams) |
| --- | --- |
| Charge 1 | |
| PC-1122 (a) | 936.10 |
| THF (b) | 500.00 |
| MEHQ (c) | 0.20 |
| Charge 2 | |
| ICEMA (d) | 155.16 |
| THF | 500.00 |

(a) An aliphatic polycarbonate diol, reported to be polyhexamethylene dicarbonate, available from Stahl USA.
(b) Tetrahydrofuran
(c) Hydroquinone monomethylether
(d) Isocyanatoethylmethacrylate Charge 1 was added to an all glass reactor. The ingredients were mixed with an air sparge. Heat was applied to the charge in the reactor until the charge reached a temperature of 60° C. Charge 2 was added over a period of about an hour. Upon completion of the addition of Charge 2, the reaction mixture was mixed for 6 hours. The resulting solution was vacuum stripped at 40° C. and 10 mm of mercury for 1 hour. The resulting polymer solution had a measured total solids content, based on the total solution weight, of about 91.71%. The polymer had a weight average molecular weight, as measured by gel permeation chromatography using polystyrene as a standard, of about 6473 and a number average molecular weight of 2480.

Component 2

Step 1

A polylactone diol bis(chloroformate) intermediate was prepared from the ingredients as summarized in Table 2. The polycaprolactone diol bis(chloroformate) intermediate is useful in the preparation of polycaprolactone diol bis(meth) acryloyl carbonate) monomers.

TABLE 2

| Ingredients | Weight (grams) |
| --- | --- |
| Charge 1 | 67 |
| phosgene | |
| Charge 2 | 3393 |
| polylactone diol (e) | |
| Charge 3 | 1713 |
| phosgene | |

(e) TONE 0201 poly(epsilon-caprolactone) diol obtained from Union Carbide.

Charge 1 was added over a period of 15 minutes to a 5 liter four-necked round-bottom jacketed flask with concurrent cooling to 5° C. The flask was equipped with a motor driven TEFLON polymer stir blade, a phosgene inlet tube, a thermocouple, pressure equalizing addition funnel, and a cold condenser connected to a sodium hydroxide scrubber. With the completion of the addition of Charge 1, Charges 2 and 3 were each added to the flask simultaneously over a period of 8.5 hours and 7.5 hours, respectively. During the addition of Charges 2 and 3, the temperature of the contents of the flask were observed to rise to no more than 38° C. At the end of the addition of Charge 2, a heating mantle was placed on the flask and the contents of the flask were maintained at a temperature of 32° C. throughout the rest of the addition of Charge 3. With the completion of the addition of Charge 3, the contents of the flask were sparged at a temperature of 32° C. with nitrogen gas for a period of approximately 24 hours. The contents of the flask were transferred to a suitable container. The assay of the reaction was determined to be 99 percent, based on a titration of a mixture of the product and pyridine.

Step 2

The polylactone diol bis(chloroformate) intermediate of Step 1 was used with the ingredients summarized in Table 3 to prepare the polylactone diol bis((meth)acryloyl carbonate) monomer as follows.

TABLE 3

| Ingredients | Weight (grams) |
| --- | --- |
| Charge 1 | |
| polycaprolactone bis (chloroformate) intermediate | 328 |
| hydroxyethylmethacrylate | 134 |
| methylene chloride | 200 |
| Charge 2 | |
| 50 percent sodium hydroxide (f) | 102 |

(f) An aqueous solution containing sodium hydroxide in an amount of 50 percent by weight, based on the total weight of the solution.

Charge 1 was added to a 1 liter round-bottom jacketed glass flask, which was equipped with a motor driven TEFLON polymer blade, water cooled condenser, a circulating cooling unit (for the jacket of the flask) and a thermometer connected through a temperature feed-back control device. The contents of the flask were cooled to 0° C. and Charge 2 was added slowly over a period of 35 minutes. Throughout the addition of Charge 2, the temperature of the contents of the flask was not observed to exceed 20° C. Upon completing the addition of Charge 2, 50 grams of water was added and the contents of the flask were stirred for an additional 2 hours at a temperature of approximately 20° C. The contents of the flask were separated into organic and aqueous phases by the addition of 800 milliliters (ml) of deionized water and 0.05 grams of butylated hydroxytoluene to the flask. The organic phase was collected and washed with 300 grams of a 10 weight percent aqueous sodium hydroxide solution. Deionized water, 400 grams, was added and after 1 hour the organic phase was collected. The organic phase was washed with 500 grams of deionized water containing 0.035 grams of butylated hydroxytoluene. The organic phase was collected after 1 hour and washed with 600 grams of deionized water. The organic phase was collected after 18 hours and was sparged with air for 2 hours. The organic phase was stripped at a temperature of 35° C. under a vacuum of 12 millimeters (mm) of mercury for 30 minutes and at 48° C. under 10 mm of mercury for 40 minutes. The resulting product was filtered through a 0.45 micron filter. The resulting reactive oligomeric product of Component 2 was obtained in 85 percent yield, and was found to have a Hydroxyl number of 5.62 mg KOH/gram of sample and a weight average molecular weight, as measured by gel chromatography using polystyrene as a standard, of from 500 to 1400.

Component 3

The reaction product of a polycarbonate polyol and (meth)acryloyl chloride was prepared from the ingredients as summarized in Table 4.

TABLE 4

| Ingredients | Weight (grams) |
| --- | --- |
| Charge 1 | |
| PC-1122 (a) | 234.40 |
| THF (b) | 301.30 |
| MEHQ (c) | 0.24 |
| Sodium acetate | 37.40 |
| Charge 2 | |
| Methacryloyl chloride | 26.2 |
| THF | 100.80 |

Charge 1 was added to an all glass reactor that had been flushed with nitrogen. The reactor was placed in an ice bath and Charge 2 was added over an interval of 1 hour while maintaining the temperature of the reaction mixture below 25° C. Upon completion of the addition of Charge 2, the reaction mixture was warmed to room temperature over a period of 95 minutes. Heat was applied to the charge in the reactor until the charge reached a temperature of 35° C. Reaction aliquots were quenched with methanol and analyzed by Gas Chromatography for methyl methacrylate to determine reaction conversion. The completed reaction was diluted 1 to 1 in ethyl acetate and washed twice with saturated sodium bicarbonate and twice with brine. The resulting organic solution was dried over magnesium sulfate, filtered and concentrated to approximately 92 percent solids. The resulting material was used without further purification.

The presence of methyl methacrylate was determined by injecting a standard (methyl methacrylate from Aldrich Chemical Company 99%, M5,590-9) on a HEWLETT-PACKARD® 5890 Series II gas chromatograph containing a SUPELCO® SPB-8 capillary column. A retention time of 4.29 minutes was determined under the following settings; injection port temp 200° C., detector port temp 250° C., column temperature program 2 min hold 40° C., 40–220° C. ramp @ 15 deg/min, hold 22 min @ 220° C.

Gel Permeation Chromatography data revealed the following about the final product: Mn is 2400 and Mw is 5600. The GPC system was calibrated with polyethylene glycol standards.

Photochromic Component

The Photochromic Component was prepared by adding each of the materials listed in Table 5 to a suitable vessel equipped with an agitator and means for heating. The resulting mixture was agitated and gently heated until a clear solution resulted.

TABLE 5

| Material | Weight Percent* |
| --- | --- |
| NMP (g) | 15.000 |
| Photochromic #2 (h) | 2.625 |
| Photochromic #3 (i) | 0.675 |
| Photochromic #4 (j) | 0.900 |
| Photochromic #5 (k) | 3.300 |

TABLE 5-continued

| Material | Weight Percent* |
|---|---|
| IRGANOX ® 245 (l) | 3.000 |
| TINUVIN ® 622 (m) | 2.000 |

*The weight percents listed in Table 5 are based on the total weight of the monomers.
(g) N-methylpyrrolidone
(h) A 2H-naphtho[1,2-b]pyran that exhibits a blue-gray color when irradiated with ultraviolet light.
(i) A 2H-naphtho[1,2-b]pyran that exhibits a green-blue color when irradiated with ultraviolet light.
(j) A 2H-naphtho[1,2-b]pyran that exhibits a yellow-orange color when irradiated with ultraviolet light.
(k) A 2H-naphtho[1,2-b]pyran that exhibits a yellow-orange color when irradiated with ultraviolet light.
(l) An antioxidant/stabilizer available from Ciba Specialty Chemicals Corp.
(m) A hindered amine ultraviolet light stabilizer available from Ciba Specialty Chemicals Corp.

EXAMPLES 1–14

Table 6 lists the monomers by weight percent in each of Examples 1–14. The Examples were prepared by adding the monomer composition listed in Table 6 to a suitable vessel equipped with an agitator and mixing for an hour after the following additions: FC-431 fluorocarbon surfactant available from 3M, was added in an amount to provide 0.15 weight percent and Photochromic Component of Table 5 was added in an amount to provide 28.0 weight percent, both weight percents being based on the total weight of monomers.

TABLE 6

| | Example # | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| BPA2EO DMA (n) | 45 | 40 | 30 | 45 | 45 | 45 | 70 | 70 | 70 | 70 | 70 | 70 | 70 | 70 |
| Component 1 | 35 | 40 | 30 | 8.75 | 17.5 | 26.25 | 30 | 15 | 0 | 15 | 10 | 0 | 0 | 0 |
| Component 2 | 0 | 0 | 0 | 26.25 | 17.5 | 8.75 | 0 | 15 | 30 | 0 | 10 | 0 | 0 | 0 |
| Component 3 | 0 | 0 | 0 | 0 | 0 | 0 | 0 | 0 | 0 | 15 | 10 | 0 | 0 | 0 |
| TMPTMA (o) | 20 | 20 | 20 | 20 | 20 | 20 | 0 | 0 | 0 | 0 | 0 | 0 | 0 | 0 |
| BPA 10EO DMA (p) | 0 | 0 | 20 | 0 | 0 | 0 | 0 | 0 | 0 | 0 | 0 | 30 | 0 | 0 |
| BPA 20EO DMA (q) | 0 | 0 | 0 | 0 | 0 | 0 | 0 | 0 | 0 | 0 | 0 | 0 | 30 | 0 |
| BPA 30EO DMA (r) | 0 | 0 | 0 | 0 | 0 | 0 | 0 | 0 | 0 | 0 | 0 | 0 | 0 | 30 |

(n) Bisphenol A ethoxylated (1 EO/phenyl) dimethacrylate available from Sartomer, Inc.
(o) Trimethylol propane trimethacrylate available from Sartomer, Inc.
(p) Bisphenol A ethoxylated (5 EO/phenyl) dimethacrylate available from Sartomer, Inc.
(q) Bisphenol A ethoxylated (10 EO/phenyl) dimethacrylate available from Sartomer, Inc.
(r) Bisphenol A ethoxylated (15 EO/phenyl) dimethacrylate available from Sartomer, Inc.

EXAMPLE 15

The Accelerated Weathering Photochromic Percent Photopic Fatigue Test (AWPPPF Test) comprises preparing lenses in Parts A–C, coating the lenses with a polymerizable composition in Part D, measuring the microhardness of the coated lens (using a FISCHERSCOPE-® H-100 microhardness measuring instrument) in Part E, and determining the photochromic performance and fatigue in Part F, before and after weathering in Part G.

The polymerizable composition of the present invention was incorporated into the coating compositions of Examples 1–8, 10 and 11. Other polymerizable compositions, that did not contain the polymerizable composition of the present invention, such as the compositions of Examples 9, 12, 13 and 14 were also tested. The photochromic performance and fatigue test results for coatings having comparable microhardness levels were compared to determine if there was an increase or decrease in these parameters. By comparing coated lenses having comparable microhardness levels, the physical nature of the coating was taken into consideration, since it is generally known that the performance of photochromic compounds can be faster in softer polymerized matrices.

Part A

A series of piano lens blanks prepared from CR-39® monomer, which monomer is available from PPG Industries, Inc., were used. The lens blanks were 70 mm in diameter. All of the lens blanks were washed with lemon scented JOY® dishwashing detergent and water, immersed in a 12.5 weight percent, based on the total weight of the solution, aqueous sodium hydroxide solution at 60° C. for 10 seconds rinsed with deionized water, sprayed with isopropyl alcohol and dried.

Part B

The lenses prepared in Part A were coated with an adhesion promoter composition of the type described in U.S. Pat. No. 6,150,430. The adhesion promoter composition was applied to the surface of the lenses by spinning the lenses at 1500 revolutions per minute (rpm) while dispensing the composition for 9 seconds.

Part C

All of the coated lenses prepared in Part B were cured by exposure to ultraviolet radiation. The lenses were placed 6 inches beneath a DYMAX® 5000EC spot light curing system rated at an output of 400 watts per inch and subjected to 10 seconds of exposure. After the applied composition was cured, each lens was rinsed with isopropyl alcohol for 9 seconds while spinning at 1500 rpm, and dried, prior to further processing.

Part D

The lenses prepared in Part C were coated with the photochromic coating compositions of Table 6 by spinning the lenses at 1500 rpm and dispensing the coating composition for the time listed in Table 7 to produce a coating having a thickness of approximately 30 microns after curing.

TABLE 7

| Example # | Spin Time (seconds) |
| --- | --- |
| 1 | 18.0 |
| 2 | 25.0 |
| 3 | 17.0 |
| 4 | 18.0 |
| 5 | 12.0 |
| 6 | 10.0 |
| 7 | 35.0 |
| 8 | 20.0 |
| 9 | 11.0 |
| 10 | 33.0 |
| 11 | 22.0 |
| 12 and 13 | 9.0 |
| 14 | 9.5 |

The coated lenses were cured by exposure to ultraviolet radiation by placing them on a conveyer belt moving at a speed of 2.3 feet per minute (70.1 cm per minute) that passed beneath two ultraviolet type "V" lamps of 10 inch (25.4 cm) length. The first lamp was maintained at a height of 2.5 inches (6.4 cm) above the conveyor and the second lamp at 6.5 inches (16.5 cm) above the conveyor. The curing system was obtained from Eye Ultraviolet system and had been inerted with nitrogen to a level of less than 100 parts per million of oxygen.

Part E

The photochromic coated lenses prepared in Part D were subjected to microhardness testing using a FISCHER-SCOPE® HCV, Model H-100 microhardness measuring instrument available from Fischer Technology, Inc. The microhardness, measured in Newtons per $mm^2$, of the coated lenses of the Examples was determined under the conditions of a 100 milliNewton load, 30 load steps and 0.5 second pauses between load steps. The results reported in Table 8 were measured at an indenter depth of 2 um.

TABLE 8

| Example No. | Microhardness Newtons per $mm^2$ |
| --- | --- |
| 1 | 100 |
| 2 | 86 |
| 3 | 84 |
| 4 | 117 |
| 5 | 112 |
| 6 | 105 |
| 7 | 127 |
| 8 | 127 |
| 9 | 144 |
| 10 | 108 |
| 11 | 108 |
| 12 | 189 |
| 13 | 137 |
| 14 | 99 |

The results of Table 8 shows that the Examples 1–8, 10 and 11 containing Component 1 had a microhardness that ranged from 84 to 108 Newtons/$mm^2$. The other examples had a microhardness that ranged from 99 to 189 Newtons/$mm^2$.

Part F

The photochromic coated lenses prepared in Part D were tested for photochromic response on an optical bench made by Essilor of France (hereinafter designated "BMP"). Prior to testing on the BMP, the photochromic coated lenses were exposed to 365 nm ultraviolet light for about 10 minutes at a distance of about 14 cm from the lamps to activate the photochromic compound. The UVA irradiance at the sample was measured with a LI-COR Model® Li-1800 spectroradiometer and found to be 22.2 Watts per square meter. The samples were then placed under a halogen lamp for about 10 minutes at a distance of about 36 cm from the lamp to bleach, or inactivate, the photochromic compounds in the samples. The illuminance at the sample was measured with the Licor spectroradiometer and found to be 21.9 klux. The test lenses were then kept in a dark environment for at least 1 hour prior to testing on the BMP.

The BMP comprises a flat metal surface to which was fitted two 150 watt Xenon arc lamps positioned 90° apart (one lamp to provide the amount of UV/VIS light and one to provide the additional contribution of visible light). The somewhat collimated output beams from the xenon arc lamps were combined and directed toward the sample cell and toward irradiance detectors through a 50/50 beam splitter. Each lamp was filtered and shuttered individually and also shuttered after blending, prior to entering the sample cell. Each lamp was also filtered with a SCHOTT® 3 mm KG-2 band-pass filter. The lamp for supplemental visible light was additionally filtered with a 400 nm cutoff filter.

Set up of the BMP software required correlation factors between spectroradiometric measurements at the sample and with a GRASEBY® Model 5380 dual channel optometer fitted with a Model #268UVA UVA detector and a Model #268P visible light detector. The optometer detectors were mounted on an optical rail carrier and received one-half of the split and combined light beams from the xenon arc lamps. The lens sample cell was fitted with a quartz window and self-centering sample holder. The temperature in the sample cell was controlled at 73.4° F. (23° C.) through the software with a modified Facis, Model FX-10, environment simulator. Irradiance at the sample was established at 6.7 Watts per square meter UVA and 50 Klux illuminance. A ZEISS® spectrophotometer, Model MCS 501, with fiber optic cables for light delivery from a tungsten halogen lamp and through the sample was used for response and color measurements. The collimated monitoring light beam from the fiber optic cable was maintained perpendicular to the test sample while passing through the sample and directed into a receiving fiber optic cable assembly attached to the spectrophotometer. The exact point of placement of the sample in the sample cell was where the activating xenon arc beam and the monitoring light beam intersected to form two concentric circles of light. The angle of incidence of the xenon arc beam at the sample placement point was ≈20° from perpendicular.

Response measurements, in terms of a change in optical density (ΔOD) from the unactivated or bleached state to the activated or darkened state were determined by establishing the initial unactivated transmittance, opening the shutter from the Xenon lamp(s) and measuring the transmittance through activation at selected intervals of time. Change in optical density is determined according to the formula: ΔOD=log(%Tb/%Ta), where %Tb is the percent transmittance in the bleached state, %Ta is the percent transmittance in the activated state and the logarithm is to the base 10.

The Bleach Rate (T½) is the time interval in seconds for the ΔOD of the activated form of the photochromic compound in the test square to reach one half the highest ΔOD after removal of the source of activating light. The Activation Rate (A½) is the time interval in seconds of irradiation that it takes to achieve 50% of the change in optical density (ΔOD) obtained after 15 minutes of irradiation. The results for the photochromic coated lenses are listed in Table 9.

TABLE 9

| Example # | ΔOD at 15 minutes | A½(sec) | T½ (sec) |
|---|---|---|---|
| 1 | 0.62 | 18 | 64 |
| 2 | 0.63 | 16 | 59 |
| 3 | 0.61 | 17 | 63 |
| 4 | 0.61 | 21 | 86 |
| 5 | 0.62 | 20 | 76 |
| 6 | 0.59 | 29 | 70 |
| 7 | 0.59 | 22 | 87 |
| 8 | 0.63 | 25 | 108 |
| 9 | 0.66 | 28 | 117 |
| 10 | 0.58 | 17 | 61 |
| 11 | 0.59 | 20 | 75 |
| 12 | 0.61 | 79 | 513 |
| 13 | 0.66 | 33 | 151 |
| 14 | 0.66 | 23 | 91 |

The results of Table 9 show that Examples 1–8, 10 and 11 containing Component 1 individually or in combination with Component 2, Component 3, Trimethyolpropane trimethacrylate and/or Bisphenol A (10 ethoxy units) dimethacrylate in a Bisphenol A (2 ethoxy units) dimethacrylate formulation demonstrated Activation (A½) and/or Bleach (T½) rates that were faster than all of the other examples tested except Example 14. The change in optical density (ΔOD) of Examples 1–8, 10 and 11 was comparable or somewhat lower than the other Examples tested.

Examination of both Tables 8 and 9 reveals that the microhardness (as measured by the FISCHERSCOPE® microhardness measuring instrument) of the coatings of Examples 1, 4–8, 10 and 11 was equal to or higher than that of Example 14, which indicates that the improvement in photochromic performance, e.g., Activation (A½) and/or Bleach (T½) rates, demonstrated by Examples 1, 4–8, 10 and 11 was not due to the physical nature of the coating, e.g., being softer or having a lower Fischer microhardness.

Part G

An ATLAS Ci4000 WEATHER-OMETER® apparatus—was used for conducting simulated solar radiation accelerated weathering. The sample results reported in Table 10 were obtained after 65 hours exposure to the filtered Xenon lamp output of 0.25 Watts per square meter at 340 nanometers in the ATLAS Ci4000 WEATHEROMETER. The temperature in the weatherometer was maintained at 45° C. and the relative humidity was controlled at 75%. The temperature of the lenses on the black panel holders typically did not exceed 55° C. After the lenses underwent the fatiguing process, they were prepared and measured on the optical bench under the same conditions prior to exposure.

Percent Fatigue (% Fat) was determined by measuring the difference between the change in optical density (ΔOD) of the test sample before and after accelerated weathering and calculating the percent reduction in optical density that the difference represents. Change in optical density (ΔOD) was determined by inserting a test lens in the bleached state into the sample holder, measuring the transmittance ($T_B$), opening the shutter from the Xenon lamp to provide solar simulated radiation to change the test sample from the bleached state to an activated (i.e., darkened) state, measuring the transmittance in the activated state ($T_A$), and calculating the change in optical density according to the formula: ΔOD=log($T_B/T_A$) (logarithm is to the base 10). Results may vary by ±2.

The Percent Photopic Fatigue was measured for the wavelength passed by the Photopic filter which closely corresponds to visible light responses detected by the human eye. Results are reported in Table 10.

TABLE 10

| Example No. | % Photopic Fatigue |
|---|---|
| 7 | 18 |
| 8 | 22 |
| 9 | 26 |
| 10 | 30 |
| 11 | 27 |
| 12 | 28 |
| 13 | 26 |
| 14 | 24 |

The results of Table 10 demonstrate that the % Photopic Fatigue of Example 7, containing 30 weight percent of Component 1, was lower than all of the other samples tested. Example 8 which contains 15 weight percent of each of Components 1 and 2 demonstrated a % Photopic Fatigue that was an average of the results of Examples 7 and 9, which each respectively contain 30% of Component 1 and 30% of Component 2. Example 10 which contains 15 weight percent of Component 1 and 15 weight percent of Component 3, a different polycarbonate polyol based dimethacrylate reaction product than Component 1, demonstrated a % Photopic Fatigue that was higher than all of the other samples tested. Example 11 which contained 10 weight percent of each of Components 1, 2 and 3 had % Photopic Fatigue results that fell between those of Examples 9 and 10.

Examples 12, 13 and 14 demonstrated decreasing % Photopic Fatigue with an increase in the ethoxy units from 10 to 20 to 30 units, respectively.

Examination of both Tables 9 and 10 demonstrates that photochromic lenses having improved performance, e.g., faster activation and bleach rates, and/or reduced fatigue, e.g., longer lifetime, were unexpectedly produced utilizing Component 1 alone or in combination with Component 2 and/or Component 3 in a (meth)acrylate formulation in place of Bisphenol A dimethacrylate having 10, 20 or 30 ethoxy units.

The present invention has been described with reference to specific details of particular embodiments thereof. It is not intended that such details be regarded as limitations upon the scope of the invention except insofar as and to the extent that they are included in the accompanying claims.

We claim:

1. A polymerizable composition comprising a photochromic amount of at least one photochromic compound, at least one material comprising at least one carbonate group and at least one hydroxyl group and at least one monoisocyanate containing material having at least one unsaturated group, said polymerizable composition being adapted to provide, when at least partially cured, a reduction in the percent fatigue of the photochromic compound in an Accelerated Weathering Photochromic Percent Photopic Fatigue Test.

2. The polymerizable composition of claim 1 wherein the at least one photochromic compound is chosen from chromenes, spiropyrans, oxazines, mercury dithizonates, fulgides, fulgimides or a mixture thereof.

3. The polymerizable composition of claim 1 wherein the at least one material comprising at least one carbonate group and at least one hydroxyl group is a polycarbonate polyol.

4. The polymerizable composition of claim 1 wherein the at least one unsaturated group is chosen from allylic, (meth)acrylic, vinyl or a mixture thereof.

5. The polymerizable composition of claim 4 wherein the at least one unsaturated group is (meth)acrylic.

6. The polymerizable composition of claim 1 further comprising at least one other copolymerizable monomer.

7. The polymerizable composition of claim 6 wherein the at least one other copolymerizable monomer is a (meth)acrylic monomer.

8. A polymerizable composition comprising:
a) a reaction product of a polyol comprising at least one carbonate group and an isocyanate comprising one reactive isocyanate group and at least one polymerizable double bond; and
b) a photochromic amount of at least one photochromic compound.

9. The polymerizable composition of claim 8 wherein the reaction product (a) is represented by the following formula:

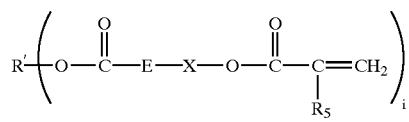

wherein R' is a residue of a polyol comprising at least one carbonate group, $R_5$ is hydrogen or methyl, E is —NH—; X is a divalent linking chosen from linear or branched chain alkylene, linear or branched chain polyoxyalkylene, cyclic alkylene, phenylene, residue of a polyol and $C_1$–$C_4$ alkyl substituted phenylene, and i is chosen from an integer from 2 to 6.

10. The polymerizable composition of claim 8 further comprising (c) at least one other monomer copolymerizable with (a).

11. The polymerizable composition of claim 10 wherein (a) is present from at least 5 percent by weight to less than 95 percent by weight based on the total weight of non-photochromic monomers in the composition.

12. The polymerizable composition of claim 8 wherein the isocyanate of (a) is chosen from:
(a) an isocyanate represented by the following formula:

wherein $R_5$ is hydrogen or methyl and X is a divalent linking chosen from linear or branched chain alkylene, linear or branched chain polyoxyalkylene, cyclic alkylene, phenylene, residue of a polyol or $C_1$–$C_4$ alkyl substituted phenylene;
(b) m-isopropenyl-α,α-dimethyl benzyl isocyanate;
(c) a product of the reaction of at least one acrylic functional monomer containing a vinyl ether group and isocyanic acid; or
(d) a mixture thereof.

13. The polymerizable composition of claim 12 wherein the isocyanate is chosen from isocyanatoethylmethacrylate; m-isopropenyl-α,α-dimethyl benzyl isocyanate; 1-(2-methacryloxyethoxy)ethyl isocyanate; or a mixture thereof.

14. An at least partially cured photochromic polymerizate of a composition comprising as ingredients (a) a photochromic amount of at least one photochromic compound, (b) at least one material comprising at least one carbonate group and at least one hydroxyl group and (c) at least one monoisocyanate containing material having at least one unsaturated group, said at least partially cured photochromic polymerizate providing a reduction in the percent fatigue of the photochromic compound in the Accelerated Weathering Photochromic Percent Photopic Fatigue Test.

15. The at least partially cured photochromic polymerizate of the composition of claim 14 wherein the composition further comprises at least one other copolymerizable monomer.

16. The at least partially cured photochromic polymerizate of the composition of claim 15 wherein the at least one other copolymerizable monomer is a (meth)acrylic monomer.

17. An at least partially cured photochromic polymerizate of a composition comprising as ingredients:
a) a reaction product of a polyol comprising at least one carbonate group and an isocyanate comprising one reactive isocyanate group and at least one polymerizable double bond; and
b) a photochromic amount of at least one photochromic compound.

18. The at least partially cured photochromic polymerizate of the composition of claim 17 wherein the polymerizate is an optical element.

19. The at least partially cured photochromic polymerizate of the composition of claim 17 wherein the composition further comprises (c) at least one other monomer copolymerizable with (a).

20. The at least partially cured photochromic polymerizate of the composition of claim 19 wherein the at least one other copolymerizable monomer is a (meth)acrylic monomer.

21. A photochromic article comprising an at least partially cured polymerizate of a composition comprising (a) at least one material comprising at least one carbonate group and at least one hydroxyl group, and (b) at least one monoisocyanate containing material having at least one unsaturated group, said polymerizate having a photochromically effective amount of an at least partially imbibed photochromic material, said photochromic article providing a reduction in the percent fatigue of the photochromic compound in the Accelerated Weathering Photochromic Percent Photopic Fatigue Test.

22. A photochromic article comprising an at least partially cured polymerizate of a polymerizable composition comprising a reaction product of a polyol comprising at least one carbonate group and an isocyanate comprising one reactive isocyanate group and at least one polymerizable double bond, said polymerizate having a photochromically effective amount of an at least partially imbibed photochromic material.

23. The photochromic article of claim 22 wherein the polymerizable composition further comprises at least one other copolymerizable monomer.

24. A polymerizable composition comprising:
(a) a reaction product of a polyol comprising at least one carbonate group and an isocyanate comprising one reactive isocyanate group and at least one polymerizable double bond, and
(b) a photochromic amount of at least one photochromic compound, said polyol being a polycarbonate polyol represented by the following formula:

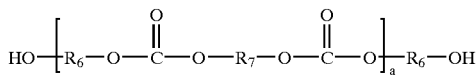

wherein $R_6$ and $R_7$ are each independently chosen for each occurrence from divalent linear or branched alkylene groups, cyclic alkylene groups or divalent $C_6$–$C_{15}$ aromatic radicals, and a is an integer selected from 1 to 20.

25. The polymerizable composition of claim 24 wherein the polycarbonate polyol is a reaction product of at least one bis(chloroformate) and at least one polyol.

26. The polymerizable composition of claim 25 wherein the bis(chloroformate) is monoethylene glycol bis(chloroformate), diethylene glycol bis(chloroformate), propanediol bis(chloroformate), butanediol bis(chloroformate), hexanediol bis(chloroformate), neopentyldiol bis(chloroformate), bisphenol A bis(chloroformate) or a mixture thereof.

27. The polymerizable composition of claim 25 wherein the polyol is bisphenol A; trimethylolethane; trimethylolpropane; di-(trimethylolpropane)dimethylol propionic acid; ethylene glycol; propylene glycol; 1,3-propanediol; 2,2-dimethyl-1,3-propanediol; 1,2-butanediol; 1,4-butanediol; 1,3-butanediol; 1,5-pentanediol; 2,4-pentanediol; 2,2,4-trimethyl-1,3-pentanediol; 2-methyl-1,3-pentanediol; 2-methyl-1,5-pentanediol; 3-methyl-1,5-pentanediol; 1,6-hexanediol; 2,5-hexanediol; 2-ethyl-1,3-hexanediol; 1,4-cyclohexanediol; 1,7-heptanediol; 2,4-heptanediol; 1,8-octanediol; 1,9-nonanediol; 1,10-decanediol;; 2,2-dimethyl-3-hydroxypropyl-2,2-dimethyl-3-hydroxypropionate; diethylene glycol; triethylene glycol; tetraethylene glycol; polyethylene glycol; dipropylene glycol; tripropylene glycol; polypropylene glycol; 1,4-cyclohexanedimethanol; 1,2-bis(hydroxymethyl)cyclohexane; 1,2-bis(hydroxyethyl)cyclohexane; the alkoxylation product of 1 mole of 2,2-bis (4-hydroxyphenyl)propane (i.e., bisphenol-A) and from 2 to 10 moles of ethylene oxide, propylene oxide or a mixture thereof; poly(oxytetramethylene)diol or a mixture thereof.

28. A polymerizable composition comprising:
(a) a reaction product of a polyol comprising at least one carbonate group and an isocyanate comprising one reactive isocyanate group and at least one polymerizable double bond, said reaction product being a monomer having a number average molecular weight greater than 2000, and
(b) a photochromic amount of at least one photochromic compound.

29. A polymerizable composition comprising:
(a) a reaction product of a polyol comprising at least one carbonate group and an isocyanate comprising one reactive isocyanate group and at least one polymerizable double bond,
(b) a photochromic amount of at least one photochromic compound, and
(c) at least one other monomer copolymerizable with the reaction product (a), said copolymerizable monomer (c) being chosen from:
(1) a radically polymerizable monomer represented by the following formula:

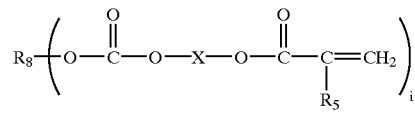

wherein $R_8$ is a polyvalent residue of a polyol, $R_5$ is hydrogen or methyl, i is chosen from an integer from 2 to 6, and X is a divalent linking group chosen from linear or branched chain alkylene, linear or branched chain polyoxyalkylene, cyclic alkylene, phenylene, residue of a polyol or a $C_1$–$C_4$ alkyl substituted phenylene;

(2) a radically polymerizable monomer represented by the following formula:

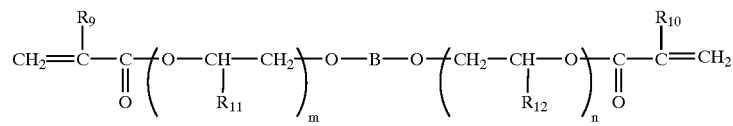

wherein m and n are each independently chosen from an integer from 0 to 6, the sum of m and n being from 0 to 6, $R_9$ and $R_{10}$ are each independently chosen from hydrogen or methyl, $R_{11}$ and $R_{12}$ are each independently chosen for each occurrence from hydrogen or $C_1$ to $C_2$ alkyl, and B is a divalent linking group chosen from linear or branched chain alkylene, phenylene, $C_1$–$C_4$ alkyl substituted phenylene, or a group represented by the following formula:

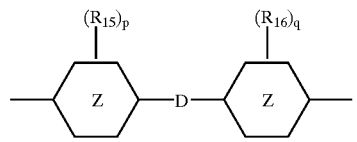

wherein $R_{15}$ and $R_{16}$ are each independently chosen for each occurrence from $C_1$–$C_4$ alkyl, chlorine or bromine, p and q are each independently chosen from an integer from 0 to 4,

represents a divalent benzene group or a divalent cyclohexane group and D is —O—, —S—, —S(O$_2$)—, —C(O)—, —CH$_2$—, —CH=CH—, —C(CH$_3$)$_2$—, —C(CH$_3$) (C$_6$H$_5$)— or

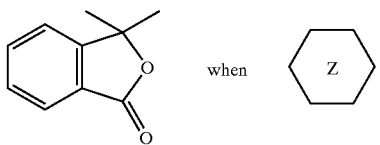 when 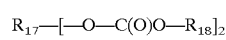

is the divalent benzene group, and D is —O—, —S—, —CH$_2$—, or —C(CH$_3$)$_2$— when

is the divalent cyclohexane group;

(3) a radically polymerizable monomer represented by the following formula:

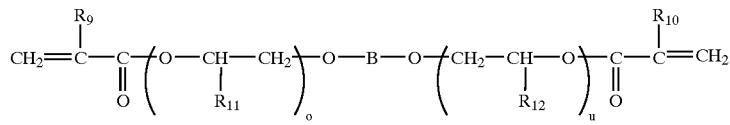

wherein o and u are each independently chosen from a positive number, the sum of o and u being from 7 to 70, $R_9$, $R_{10}$, $R_{11}$, $R_{12}$ and B are the same as defined hereinbefore;

(4) a radically polymerizable monomer represented by the following formula:

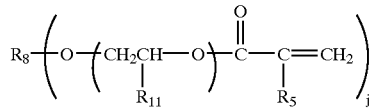

wherein $R_5$, $R_8$ and $R_{11}$ are the same defined hereinbefore, d is chosen from an integer from 0 to 20, and j is chosen from a number from 3 to 6;

(5) a reaction product of a polycarbonate polyol polychloroformate and a hydroxy(meth)acrylate;

(6) a reaction product of a polycarbonate polyol and (meth)acryloyl chloride;

(7) a radically polymerizable monomer that is monoethylenically unsaturated;

(8) a radically polymerizable monomer that is an allyl functional monomer having at least two allyl groups, provided that said allyl functional monomer is used at a level that does not exceed 5 weight percent, based on the total weight of the monomers; or (9) a mixture thereof.

30. The polymerizable composition of claim 29 wherein:

(a) $R_8$ being a polyvalent residue of a polyol chosen from an aliphatic polyol, cycloaliphatic polyol, an aromatic polyol or a polyol comprising ester groups containing at least 2 hydroxy groups, i being 2, X being a straight or branched chain alkylene;

(b) $R_9$ and $R_{10}$ each being methyl, $R_{11}$ and $R_{12}$ each being hydrogen, p, q, r and s each being 0, D being —C(CH$_3$)$_2$— and the sum of m and n being from 0 to 4;

(c) the sum of o and u being from 10 to 30;

(d) $R_8$ being a residue of trimethylolpropane, pentaerythritol or dipentaerythritol and d being from 3 to 15;

(e) the reaction product of a polycarbonate polyol polychloroformate;

(f) the reaction product of a polycarbonate polyol and methacryloyl chloride;

(g) the monoethylenically unsaturated monomer being an alkyl ester of (meth)acrylic acid, vinyl aromatic monomer, vinyl halide, vinylidene halide, vinyl ester, (meth)acryloxypropyltri(C$_1$–C$_4$)alkoxysilane (meth)acrylic acid or a mixture thereof;

(h) the allyl functional monomer being:

(i) an allyl functional monomer represented by the following formula, $R_{17}$—[—O—C(O)O—$R_{18}$]$_2$ wherein $R_{17}$ being a divalent residue of a diol chosen from 1,2-ethane diol diethylene glycol or 1,2-propane diol, and $R_{18}$ being an allyl group;

(ii) an allyl functional monomer represented by the following formula,

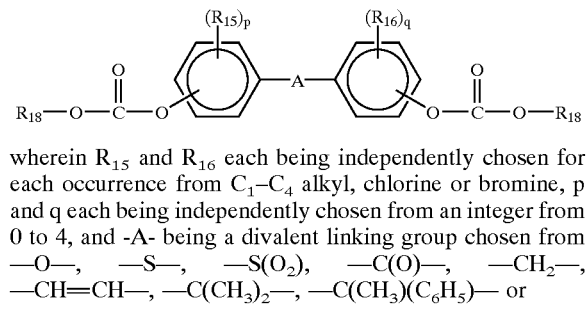

wherein $R_{15}$ and $R_{16}$ each being independently chosen for each occurrence from C$_1$–C$_4$ alkyl, chlorine or bromine, p and q each being independently chosen from an integer from 0 to 4, and -A- being a divalent linking group chosen from —O—, —S—, —S(O$_2$), —C(O)—, —CH$_2$—, —CH=CH—, —C(CH$_3$)$_2$—, —C(CH$_3$)(C$_6$H$_5$)— or

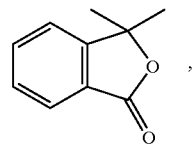

and $R_{18}$ being an allyl group;

(iii) an allyl functional monomer represented by the following formula,

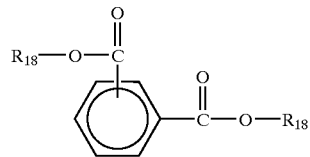

wherein $R_{18}$ being an allyl group; or (iv) a mixture at least two of (i), (ii) and (iii).

31. The polymerizable composition of claim 29 (a) wherein $R_8$ being the residue of a polyol represented by the following formula:

$$R_1-(Y-(C(O)(-CR_2R_3)_h-CHR_4-O)_t-H)_y$$

wherein: Y is —O— or —NR— and R is hydrogen or $C_1$–$C_{12}$ alkyl; $R_1$ is an organic radical derived from an initiator, $R_2$, $R_3$ and $R_4$ are each selected independently for each occurrence from hydrogen, $C_1$–$C_{12}$ alkyl, $C_5$–$C_6$ cycloalkyl, $C_1$–$C_6$ alkoxy, benzyl or phenyl, provided that at least h+2 of the total number of $R_2$, $R_3$ and $R_4$ are hydrogen, letter h is chosen from an integer from 1 to 6; t is chosen from an integer from 1 to 100; and y is chosen from an integer equal to from 2 to 6.

32. The polymerizable composition of claim 29 (a) wherein $R_8$ being the residue of a reaction product of at least one diol and at least one lactone; said diol being a linear or branched aliphatic diol having from 2 to 20 carbon atoms, poly($C_2$–$C_4$)alkylene glycol, cycloaliphatic diol having from 5 to 8 carbon atoms in the cyclic ring, monocyclic aromatic diol, bisphenol, hydrogenated bisphenol or a mixture thereof; said lactone being: beta-propiolactone; gamma-butyrolactone; beta-butyrolactone; delta-valerolactone; alpha-methyl-gamma-butyrolactone; beta-methyl-gamma-butyrolactone; gamma-valerolactone; epsilon-caprolactone; monomethyl-epsilon-caprolactones; monoethyl-epsilon-caprolactones; monopropyl-epsilon-caprolactones; monododecyl epsilon-caprolactones; methoxy epsilon-caprolactones; ethoxy epsilon-caprolactones; cyclohexyl epsilon-caprolactones; phenyl epsilon-caprolactones; benzyl epsilon-caprolactones; zeta-enatholactone; eta-caprylactone or a mixture thereof.

* * * * *